(12) United States Patent
Masuda

(10) Patent No.: US 8,179,498 B2
(45) Date of Patent: May 15, 2012

(54) LIQUID CRYSTAL DISPLAY DEVICE, TELEVISION RECEIVER, AND LIGHTING DEVICE

(75) Inventor: Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 162 days.

(21) Appl. No.: 12/450,483

(22) PCT Filed: Jul. 2, 2008

(86) PCT No.: PCT/JP2008/061989
§ 371 (c)(1),
(2), (4) Date: Sep. 28, 2009

(87) PCT Pub. No.: WO2009/016912
PCT Pub. Date: Feb. 5, 2009

(65) Prior Publication Data
US 2010/0073598 A1 Mar. 25, 2010

(30) Foreign Application Priority Data
Jul. 27, 2007 (JP) ................................ 2007-195931

(51) Int. Cl.
*G02F 1/1335* (2006.01)
(52) U.S. Cl. .......................................... 349/62; 349/61
(58) Field of Classification Search ............... 349/61, 349/62
See application file for complete search history.

(56) References Cited

U.S. PATENT DOCUMENTS

| | | | | |
|---|---|---|---|---|
| 6,690,344 B1 * | 2/2004 | Takeuchi et al. | ................. | 345/85 |
| 7,030,848 B2 * | 4/2006 | Sato et al. | ......................... | 345/95 |
| 2002/0191008 A1 * | 12/2002 | Naka et al. | ..................... | 345/690 |
| 2004/0041760 A1 * | 3/2004 | Tsumura et al. | ................ | 345/87 |
| 2006/0232544 A1 * | 10/2006 | Sakashita | ....................... | 345/102 |
| 2006/0262077 A1 * | 11/2006 | Terasaka | ........................ | 345/102 |
| 2007/0080923 A1 * | 4/2007 | Enomoto et al. | .............. | 345/102 |
| 2007/0222743 A1 * | 9/2007 | Hirakata | ........................ | 345/102 |
| 2007/0257943 A1 * | 11/2007 | Miller et al. | ................... | 345/694 |
| 2008/0180414 A1 * | 7/2008 | Fung et al. | ..................... | 345/204 |
| 2008/0211801 A1 * | 9/2008 | Shiomi | ........................... | 345/214 |

FOREIGN PATENT DOCUMENTS

| | | |
|---|---|---|
| JP | 2002-099250 | 4/2002 |
| JP | 2003-057641 | 2/2003 |
| JP | 2004-212503 | 7/2004 |
| JP | 2004-246117 | 9/2004 |
| JP | 2008-164931 | 7/2008 |

OTHER PUBLICATIONS

Satoru Kubota et al., "Television Viewing Conditions at Home", The Journal of the Institute of Image Information and Television Engineers, vol. 60, No. 4, 2006, pp. 597-603.
International Search Report.

* cited by examiner

*Primary Examiner* — K. Cyrus Kianni
(74) *Attorney, Agent, or Firm* — Harness, Dickey & Pierce, P.L.C.

(57) ABSTRACT

In an embodiment of the present invention, in a liquid crystal display device which controls a light luminance of each of lighting regions, each of lighting regions of a backlight has a smaller width in a horizontal direction than in a vertical direction. This makes it possible to cause a reduction in contrast due to spatial distribution of light luminances, which spatial distribution is generated due to cross talk between lighting regions, to be less perceivable to an observer positioned in an oblique viewing direction.

6 Claims, 21 Drawing Sheets

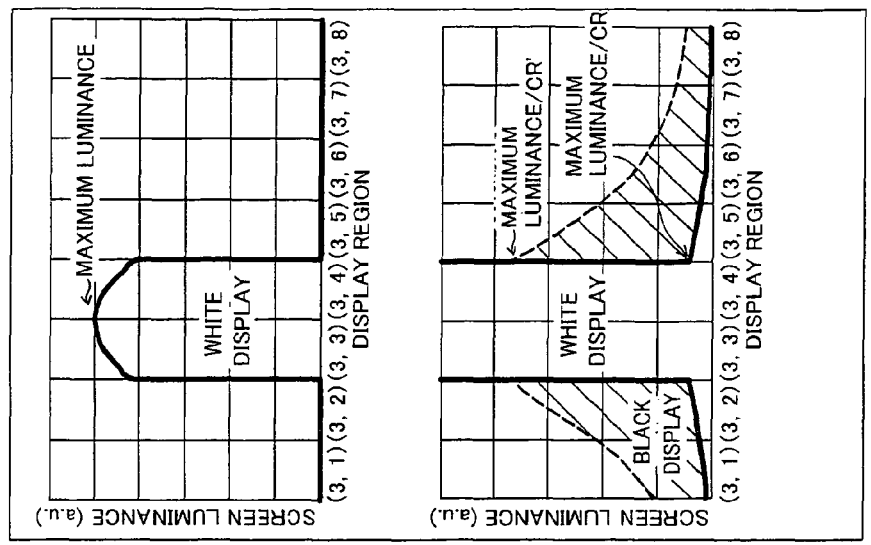
FIG. 20(a)
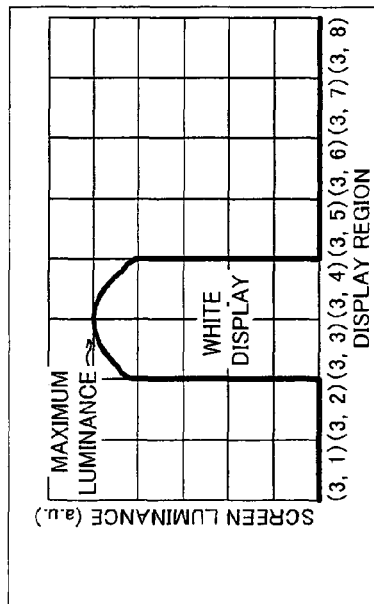
FIG. 20(c)
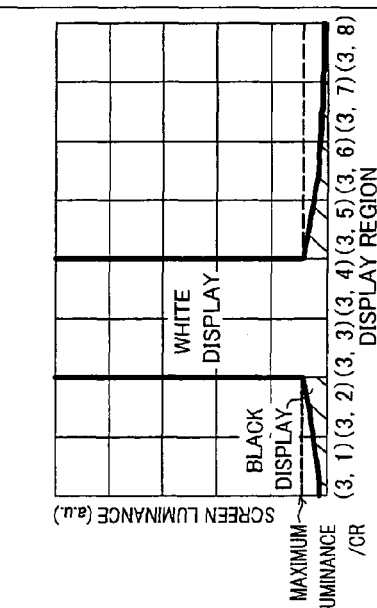
FIG. 20(d)
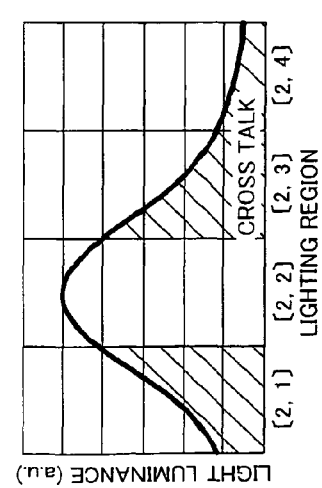
FIG. 20(b)
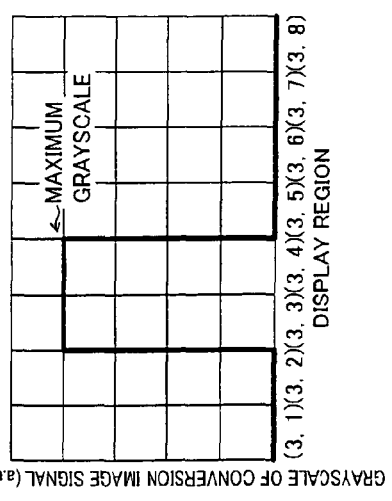

HORIZONTAL CROSS SECTION

VERTICAL CROSS SECTION

HORIZONTAL CROSS SECTION

VERTICAL CROSS SECTION

LIQUID CRYSTAL DISPLAY DEVICE, TELEVISION RECEIVER, AND LIGHTING DEVICE

TECHNICAL FIELD

The present invention relates to a liquid crystal display device including a liquid crystal display panel and a backlight (lighting device). More specifically, the present invention relates to a liquid crystal display device which controls light from a backlight in accordance with a display image so that an observer more clearly feels contrast.

BACKGROUND ART

A liquid crystal display device is characterized by its thinness, low power consumption, high definition and the like, and, as a production technique of the liquid crystal display device has been developed, it becomes possible to manufacture a large-screen liquid crystal display device. Consequently, the liquid crystal display device becomes popular in a television field which has been occupied mainly by a cathode ray tube (CRT).

However, due to a display method of the liquid crystal display device, an image displayed in the liquid crystal display device has such a problem that the observer less clearly feels its contrast (low dynamic range) than that of CRT. In view of this problem, techniques for improving image quality have been actively developed in recent years.

For example, Patent Literature 1 discloses a liquid crystal display device including: a lighting section including a plurality of lighting regions for lighting the inside of an image display section; a light luminance control section for controlling a luminance of each lighting region of the lighting section in accordance with an input image signal; and an image signal conversion section for converting the input image signal in accordance with luminance information of each lighting region.

This liquid crystal display device increases a luminance of light for a display region (lighting region) containing a large amount of bright image information and adversely decreases a luminance of a light for a display region (lighting region) containing a large amount of dark image information, in accordance with an input image signal. Thereby, contrast of an entire screen of the liquid crystal display device can be more clearly felt (thereby its dynamic range is enhanced).

Further, in the liquid crystal display device, since a luminance of light is changed for each lighting region, a luminance of a display image varies between the lighting regions if the input image signal is inputted to a liquid crystal panel with its grayscale unadjusted. For this reason, in the technique of Patent Literature 1, the input image signal is converted in accordance with a light luminance for each lighting region and then is inputted to the liquid crystal panel. This reduces the variation of the same luminance of the display image between the respective lighting regions.

Further, in the liquid crystal display device, cross talk between the lighting regions causes not only light from a lighting region beneath a certain pixel of the liquid crystal panel but also light from an adjacent lighting region to be superimposed on light for the foregoing pixel (cross talk of light is generated). That is, incoming of the light from the adjacent lighting region causes an actual luminance of light to deviate from a light luminance level for each lighting region which light luminance level has been used to generate a conversion image signal. This generates an error in the luminance of the display image. Therefore, in the technique of Patent Literature 1, in order to compensate the error of the display image due to a deviation of the actual luminance of light from the light luminance level, a grayscale level of a final conversion image signal is generated by use of a correction look-up table in which correction table data corresponding to a combination of a light luminance level of a certain lighting region and a light luminance level of an adjacent lighting region is stored.

Citation List

Patent Literature 1

Japanese Patent Application Publication, Tokukai, No. 2002-99250 A (Publication Date: Apr. 5, 2002)

Non Patent Literature 1

Satoru KUBOTA and four others, "Television viewing conditions at home", Journal of the Institute of Image Information and Television Engineers, Vol. 60, No. 4, pp. 597-603, 2006

SUMMARY OF INVENTION

However, in the technique of Patent Literature 1, although the correction look-up table is used to correct the error of the display image due to spatial distribution of the light luminances, which spatial distribution is generated due to cross talk of light between the lighting regions, this method may fail to appropriately correct the error of the display image as described below.

(a) of FIG. 19 is a view schematically illustrating an example of a display region of a liquid crystal display panel, and (b) of FIG. 19 is a view schematically illustrating an example of a lighting region of a backlight unit. In the example of (a) of FIG. 19, a display screen is divided into eight pieces in a horizontal direction, and the display screen is divided into six pieces in a vertical direction, and in (b) of FIG. 19, the lighting region is divided into four pieces in a horizontal direction, and the lighting region is divided into three pieces in a vertical direction. A lighting region [2,2] is disposed directly below display regions (3,3), (3,4), (4,3), and (4,4). Further, a luminance of each lighting region is set to be any one of 1 through 3 luminance levels. Note that, configurations respectively illustrated in FIG. 19 and below-explained FIGS. 20 and 21 were devised by the inventors of the present invention to explain problems of the technique of Patent Literature 1. These configurations have not been publicly known.

In the examples respectively illustrated in (a) and (b) of FIG. 19, the display regions (3,3), (3,4), (4,3), and (4,4), which correspond to the lighting region (2,2), are white display and the other display regions are black display. In this case, a luminance level of the lighting region (2,2) is set to be 3 (maximum luminance level), and a luminance level of each of the other lighting regions is set to be 1 (minimum luminance level). Further, a conversion image signal inputted to the liquid crystal panel is such that the display regions (3,3), (3,4), (4,3), and (4,4) are white display, that is, a maximum grayscale, and the other display regions are black display, that is, a minimum grayscale.

(a) of FIG. 20 is a graph showing an actual luminance of each lighting region in a case where a luminance of each lighting region is set to be a luminance level of (b) of FIG. 19. Further, (b) of FIG. 20 is a graph showing a luminance of the conversion image signal for each display region in a case where display corresponding to (a) of FIG. 19 is carried out.

Further, (c) of FIG. 20 is a graph showing spatial distribution of luminances in a case where an image displayed in a VA-mode liquid crystal display device is viewed from the front thereof (from a direction vertical to a display screen)

while the luminance level of each lighting region is set in the same manner as in (a) of FIG. 20 and the conversion image signal for each display region is set in the same manner as in (b) of FIG. 20. Note that, contrast CR of the liquid crystal panel in the case where the VA-mode display device is viewed from its front is 1900. Further, in (c) of FIG. 20, a graph in an upper part and a graph in a lower part show the same data in such a manner that a vertical axis range is changed. Further, a dashed line of (c) of FIG. 20 shows spatial distribution of luminances observed in a case where the same image is displayed in a liquid crystal display device in which a luminance of a backlight is not controlled (a liquid crystal display device in which luminances of the respective lighting regions are uniformly set) and the displayed image is viewed from its front.

As illustrated in (c) of FIG. 20, in the liquid crystal display device in which the luminance of the backlight is not controlled, luminances of the respective lighting regions are uniform, so that a display luminance of the black display part is determined only by the contrast CR of the liquid crystal panel. Meanwhile, in the liquid crystal display device in which a luminance of a backlight is controlled (in a liquid crystal display device in which a luminance of each lighting region is controlled), a luminance of a black display part is determined by the contrast CR of the liquid crystal panel and spatial distribution of a light luminance of the backlight, so that it is possible to effectively improve the contrast. However, on the other hand, the luminance of the black display part of the image displayed in the liquid crystal display device varies depending on a position (distance from the white display part). As the position is further away from the white display part, the luminance becomes lower.

A human visual characteristic is such that a luminance difference in a dark part is perceived as being greater than a luminance difference in a bright part. Therefore, if a luminance difference occurs depending on a position in the black display part, such a luminance difference is likely to be perceived by a human, so that the luminance difference is likely to be recognized as a defective image.

Further, (a) of FIG. 21 is a graph showing an example of a relationship between a viewing angle and contrast in a general VA-mode liquid crystal display panel, and (b) of FIG. 21 is a graph showing an example of a relationship between a viewing angle and contrast in a general IPS-mode liquid crystal display panel. As shown in these graphs, in the liquid crystal panel, contrast varies depending on a viewing angle, and contrast drops as the viewing angle more greatly inclines.

A dashed line of (d) of FIG. 20 is a graph showing spatial distribution of luminances observed in a case where the same image as in (c) of FIG. 20 is viewed at a viewing angle of 60° (from a direction whose angle is horizontally 60° with respect to a direction vertical to a screen surface). Note that, contrast CR' of the liquid crystal panel in a case where the VA-mode liquid crystal display device is viewed at a viewing angle of 60° is 210. Further, as shown by the continuous line of the graph of (c) of FIG. 20, a continuous line of (d) of FIG. 20 is a graph showing spatial distribution of luminances in a case where the image is viewed from its front. Note that, an upper part and a lower part of (d) of FIG. 20 show the same data in such a manner that its vertical range is changed.

As shown in (d) of FIG. 20, when the liquid crystal panel is viewed from an oblique direction, a luminance difference depending on a position in the black display part becomes greater due to a reduction in contrast of the liquid crystal panel, so that the observer feels that defectiveness of the image increases as compared with the case where the image is viewed from the front direction.

The present invention is made in view of the foregoing problem, and an object of the present invention is, in a liquid crystal display device which controls a light luminance in accordance with a lighting region, to cause a reduction in contrast due to spatial distribution of light luminances, which spatial distribution is generated due to cross talk between lighting regions, to be less perceivable to an observer positioned in an oblique viewing direction (horizontal viewing direction).

In order to attain the object, a liquid crystal display device of the present invention includes: a liquid crystal display panel; lighting means including a plurality of lighting regions for lighting the liquid crystal display panel; driving means for driving the liquid crystal display panel so that an image is displayed in accordance with an input image signal; and light control means for controlling a luminance of each of the plurality of lighting regions of the lighting means, in accordance with the input image signal, each of the lighting regions having a smaller width in a left-and-right direction of a display screen of the liquid crystal display panel than in an up-and-down direction of the display screen.

With the arrangement, each of the lighting regions is arranged to have a smaller width in the left-and-right direction than in the up-and-down direction. Thereby, it is possible to cause a part between the lighting regions, where cross talk occurs, to spread less greatly in the left-and-right direction than in the up-and-down direction. Therefore, it is possible to (i) cause a reduction in contrast due to spatial distribution of light luminances, which spatial distribution is generated due to cross talk between lighting regions, to be less perceivable to an observer positioned in a wide viewing angle range in the left-and-right direction, and thereby (ii) provide the observer with a high quality image.

Further, the liquid crystal display device may be configured so that the lighting means has an effective lighting region of a rectangle shape, the lighting means emits light, toward the liquid crystal display panel, from the effective lighting region in which the plurality of lighting regions are disposed in matrix, and $h > v \times H/V$, where V is a length of the effective lighting region in the up-and-down direction, H is a length of the effective lighting region in the left-and-right direction, v is the number of the plurality of lighting regions disposed in the up-and-down direction, and h is the number of the plurality of lighting regions disposed in the left-and-right direction.

With the arrangement, each of the lighting regions can have a smaller width in the left-and-right direction than in the up-and-down direction. Therefore, it is possible to (i) cause a reduction in contrast due to spatial distribution of light luminances, which spatial distribution is generated due to cross talk between lighting regions, to be less perceivable to an observer positioned in a wide viewing angle range in the left-and-right direction, and thereby (ii) provide the observer with a high quality image.

Furthermore, the liquid crystal display device may be configured so that the lighting means includes a light source unit in each of the plurality of lighting regions, and the light control means controls the luminance of each of the plurality of lighting regions by controlling light intensity of the light source unit included in each of the plurality of lighting regions.

With the arrangement, it is possible to control the luminance of each of the plurality of lighting regions by controlling the light intensity of the light source unit included in each of the plurality of lighting regions. Thereby, it is possible to control the luminance of each of the plurality of lighting regions easily and accurately.

Further, the liquid crystal display device may be configured so that the lighting means includes a plurality of the light source units in each of the plurality of lighting regions.

In a case where the light source units and the lighting regions correspond to each other one by one, it is necessary to cause a cycle at which the light source units are disposed to coincide with a cycle at which the lighting regions are disposed, for the purpose of causing each of the lighting regions to have a smaller width in the left-and-right direction than in the up-and-down direction. On the other hand, with the arrangement described above, each of the lighting regions includes the plurality of light source units. Therefore, it is unnecessary to cause the cycle at which the light source units are disposed to coincide with the cycle at which the lighting regions are disposed. Therefore, it is possible to more freely design the lighting means.

Further, the liquid crystal display device may be configured so that the light source unit is an LED.

With the arrangement, by controlling an amount of a current supplied to the LED, it is possible to control the light intensity of the light source unit easily and accurately.

Furthermore, the liquid crystal display device may further includes: luminance distribution calculation means for calculating, in accordance with the luminance set by the light control means for each of the plurality of lighting regions, luminance distribution of light entering from the lighting means into the liquid crystal display panel while taking into consideration of cross talk of light between the plurality of lighting regions; and grayscale conversion means for converting, in accordance with the luminance distribution calculated by the luminance distribution calculation means, the input image signal into a conversion image signal so that an influence of the cross talk on a display image is reduced, the driving means driving the liquid crystal display panel so that an image is displayed in accordance with the conversion image signal.

The luminance that the observer feels with an image displayed on the liquid crystal display panel is determined by (i) luminance distribution of emitted light and (ii) a luminance of an image signal for driving the liquid crystal display panel. With the arrangement described above, a conversion image signal is generated so that an influence of cross talk of the light on a display image is suppressed, and an image is displayed on the liquid crystal display panel in accordance with the conversion image signal. Thereby, it is possible to further suppress the influence of the cross talk of the light.

A television receiver of the present invention includes receiving means for receiving a television broadcast, and a liquid crystal display device according to any one of claims 1 through 6, and the liquid crystal display device is arranged to display an image in accordance with the television broadcast received by the receiving means.

Non Patent Literature 1 describes such an investigation report that television viewing angles at a general home widely distribute within a range of ±60° in a horizontal direction (left-and-right direction) and ±30° in a vertical direction (up-and-down direction). That is, under a general television viewing condition, an observer is likely to feel defectiveness of an image in horizontal viewing angles rather than in vertical viewing angles, which defectiveness is caused due to a luminance difference depending on a position of a black display part.

With the arrangement, each of the lighting regions has a smaller width in the left-and-right direction than in the up-and-down direction, so that it is possible to cause a part between the lighting regions, where the cross talk occurs, to spread narrower in the left-and-right direction than in the up-and-down direction. Thereby, it is possible to (i) cause a reduction in contrast due to spatial distribution of light luminances, which spatial distribution is generated due to cross talk between lighting regions, to be less perceivable to an observer positioned in a wide viewing angle range in the left-and-right direction, and thereby (ii) provide the observer with a high quality image. This allows the observer to view a high quality image of a television broadcast.

A lighting device of the present invention includes a plurality of lighting regions for lighting regions of a liquid crystal panel, respectively, each of the plurality of lighting regions having a smaller width in a left-and-right direction of a display screen of the liquid crystal display panel than in an up-and-down direction of the display screen.

With the arrangement, each of the lighting regions has a smaller width in the left-and-right direction than in the up-and-down direction, so that it is possible to cause a part between the lighting regions, where the cross talk occurs, to spread narrower in the left-and-right direction than in the up-and-down direction. Thereby, it is possible to (i) cause a reduction in contrast due to spatial distribution of light luminances, which spatial distribution is generated due to cross talk between lighting regions, to be less perceivable to an observer positioned in a wide viewing angle range in the left-and-right direction, and thereby (ii) provide the observer with a high quality image.

BRIEF DESCRIPTION OF DRAWINGS

FIG. 1 is a view schematically illustrating a configuration of a liquid crystal display device in accordance with an embodiment of the present invention.

FIG. 2 is a view schematically illustrating a configuration of a backlight unit provided to the liquid crystal display device illustrated in FIG. 1.

FIG. 3 is a block diagram schematically illustrating the configuration of the liquid crystal display device illustrated in FIG. 1.

FIG. 4 is a graph showing luminance distribution around a certain lighting region which luminance distribution is observed when an LED of only the certain lighting region is turned on in the liquid crystal display device illustrated in FIG. 1.

FIG. 5 is a graph showing an example of a relationship between the number of pieces obtained by dividing the lighting region and cross talk.

FIG. 6 is a view schematically illustrating a configuration of a liquid crystal display device in accordance with Comparative Example 1.

FIG. 7 is a view schematically illustrating a backlight unit provided to the liquid crystal display device illustrated in FIG. 6.

FIG. 8 is a graph showing luminance distribution around a certain light region which luminance distribution is observed when an LED of only the certain lighting region is turned on in the liquid crystal display device illustrated in FIG. 6.

FIG. 9 is a graph showing luminance distribution around a certain lighting region which luminance distribution is observed when an LED of only the certain lighting region is turned on in the liquid crystal display device illustrated in FIG. 1 and in the liquid crystal display device illustrated in FIG. 6.

FIG. 10 is a graph showing luminance distribution, in a viewing angle direction whose angle is 60° with respect to a horizontal direction, around a certain lighting region, when an LED of only the certain lighting region is turned on in the liquid crystal display device illustrated in FIG. 1 and in the liquid crystal display device illustrated in FIG. 6.

FIG. 11 is a view schematically illustrating a configuration of a liquid crystal display device in accordance with another embodiment of the present invention.

FIG. 12 is a view schematically illustrating a configuration of a backlight unit provided to the liquid crystal display device illustrated in FIG. 11.

FIG. 13 is a graph showing luminance distribution around a certain lighting region which luminance distribution is observed when an LED of only the certain lighting region is turned on in the liquid crystal display device illustrated in FIG. 11.

FIG. 14 is a view schematically illustrating a configuration of a liquid crystal display device in accordance with Comparative Example 2.

FIG. 15 is a view schematically illustrating a configuration of a backlight unit provided to the liquid crystal display device illustrated in FIG. 14.

FIG. 16 is a graph showing luminance distribution around a certain lighting region which luminance distribution is observed when an LED of only the certain lighting region is turned on in the liquid crystal display device illustrated in FIG. 14.

FIG. 17 is a graph showing luminance distribution around a certain lighting region which luminance distribution is observed when an LED of only the certain lighting region is turned on in the liquid crystal display device illustrated in FIG. 11 and in the liquid crystal display device illustrated in FIG. 14.

FIG. 18 is a graph showing luminance distribution, in a viewing angle direction whose angle is 60° with respect to a horizontal direction, around a certain lighting region, which luminance distribution is observed when an LED of only the certain lighting region is turned on in the liquid crystal display device illustrated in FIG. 11 and in the liquid crystal display device illustrated in FIG. 14.

Figures 19A, 19B:
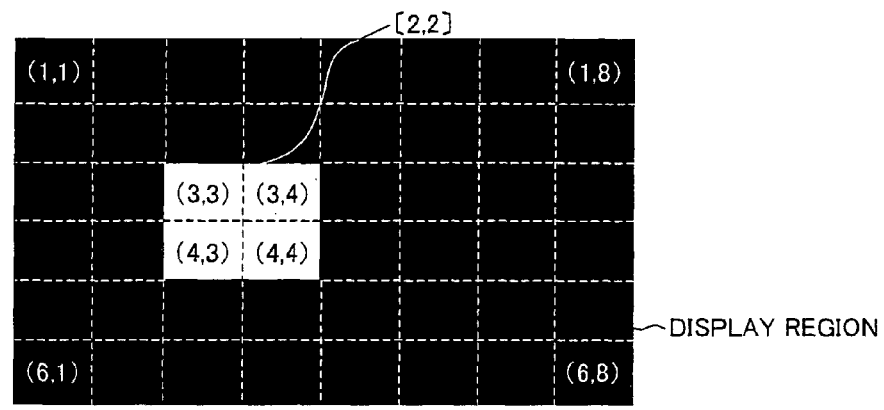

(a) of FIG. 19

(a) of FIG. 19 is a view schematically illustrating an example of a divided display region of a conventional liquid crystal display device.

(b) of FIG. 19

(b) of FIG. 19 is a view schematically illustrating an example of divided lighting region of a conventional liquid crystal display device.

(a) of FIG. 20

(a) of FIG. 20 is a graph showing an example of luminance distribution around a certain lighting region which luminance distribution is observed when an LED of only the certain lighting region is turned on in the liquid crystal display device illustrated in (a) of FIG. 19 and (b) of FIG. 19.

(b) of FIG. 20

(b) of FIG. 20 is a graph showing an example of a luminance of a conversion image signal for each display region of the liquid crystal display device illustrated in (a) of FIG. 19 and (b) of FIG. 19.

(c) of FIG. 20

(c) of FIG. 20 is a graph showing spatial distribution of luminances observed in a case where an image displayed on a VA-mode liquid crystal display device is viewed from its front when a luminance level of each lighting region is set as in (a) of FIG. 20 and a conversion image signal for each display region is set as in (b) of FIG. 20.

(d) of FIG. 20

(d) of FIG. 20 is a graph showing spatial distribution of luminances observed in a case where the same image as in (c) of FIG. 20 is viewed from a viewing angle direction whose angle is 60°.

Figure 21A:
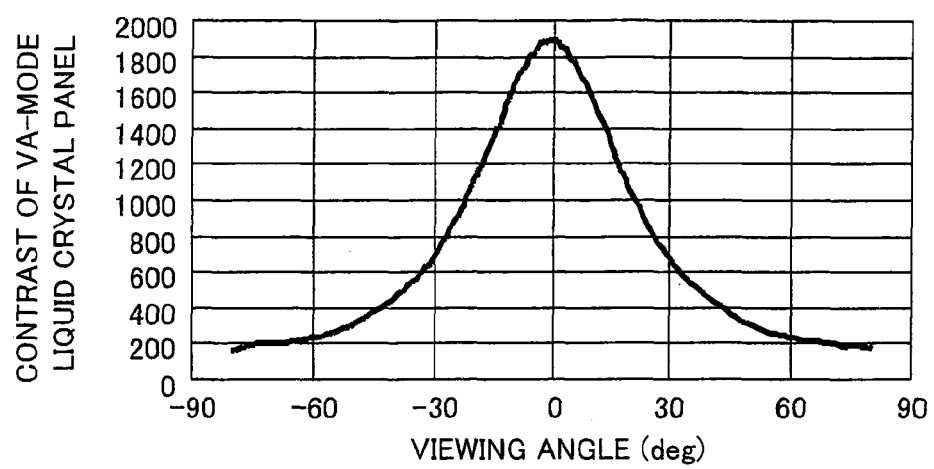
Figure 21B:
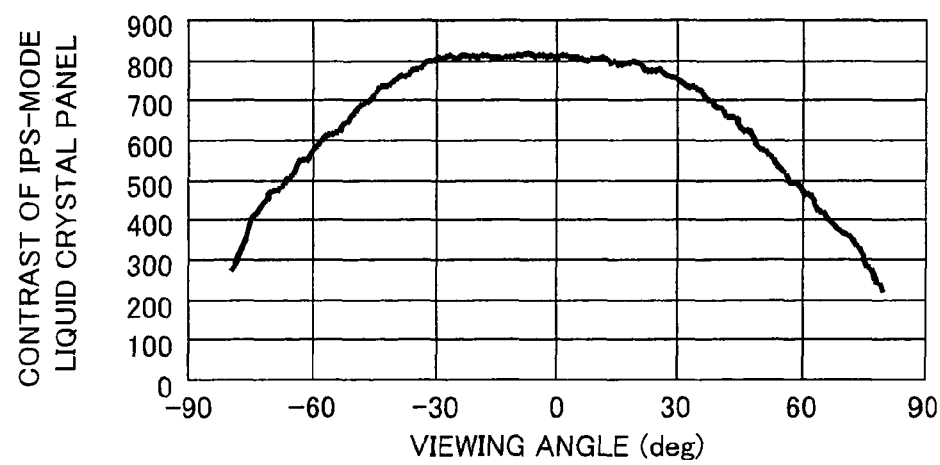

(a) of FIG. 21

(a) of FIG. 21 is a graph showing an example of a relationship between a viewing angle direction and contrast in a VA-mode liquid crystal panel.

(b) of FIG. 21

(b) of FIG. 21 is a graph showing an example of a relationship between a viewing angle direction and contrast in an IPS-mode liquid crystal panel.

Figure 22A:
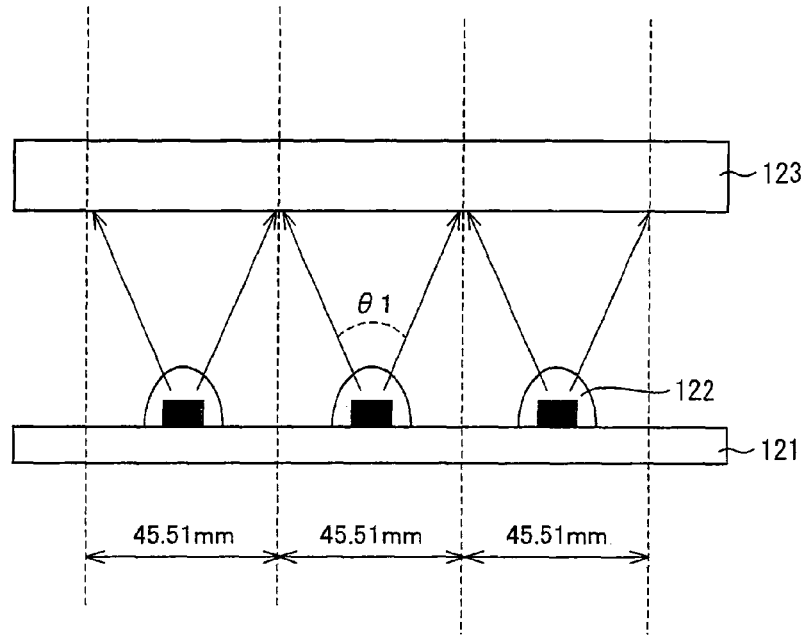
Figure 22B:
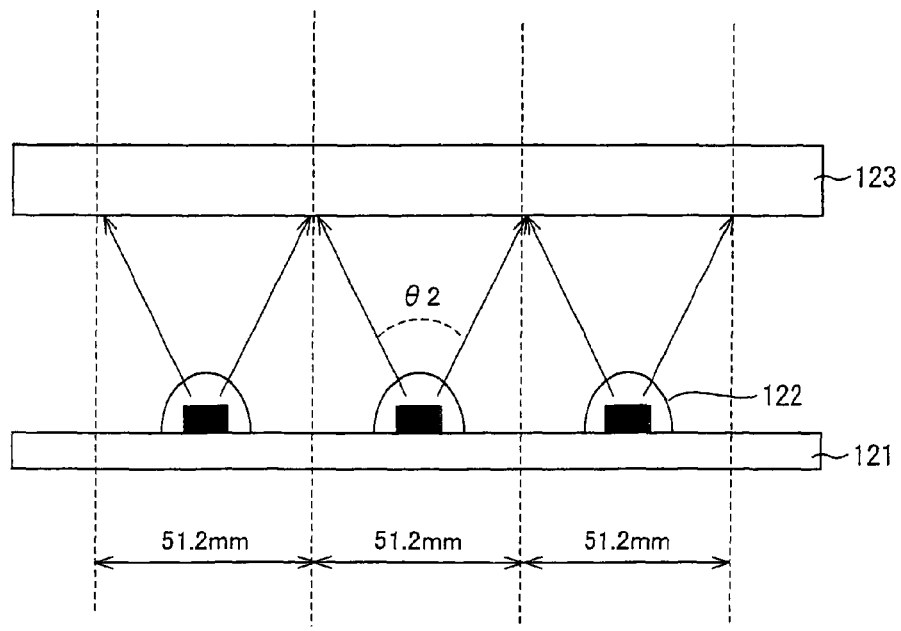

(a) of FIG. 22

Figure 1:
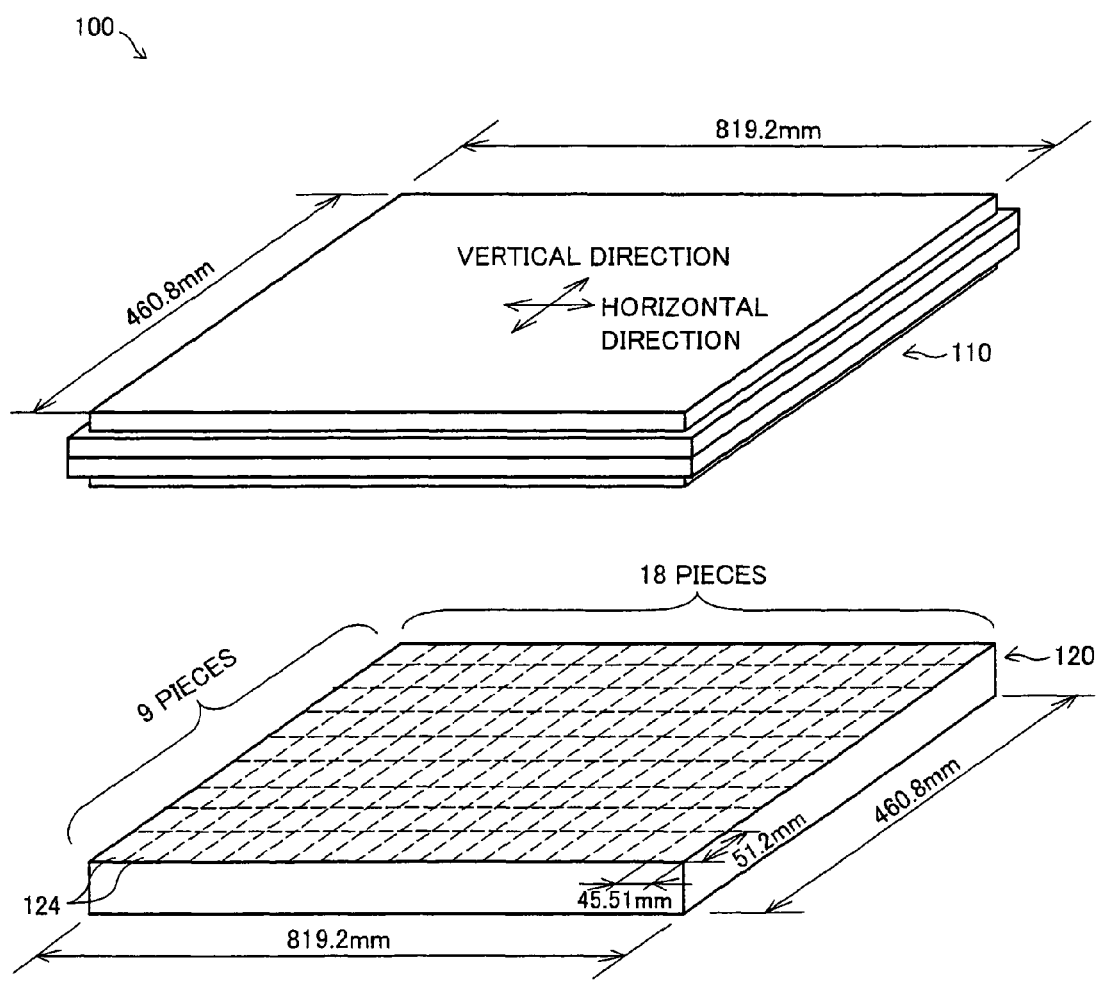
FIG. 1

(a) of FIG. 22 is an explanatory view illustrating a cross section along a horizontal direction of the liquid crystal panel and the backlight unit both of which are included in the liquid crystal display device illustrated in FIG. 1.

(b) of FIG. 22

(b) of FIG. 22 is an explanatory view illustrating a cross section along a vertical direction of the liquid crystal panel and the backlight unit both of which are included in the liquid crystal display device illustrated in FIG. 1.

Figure 23A:
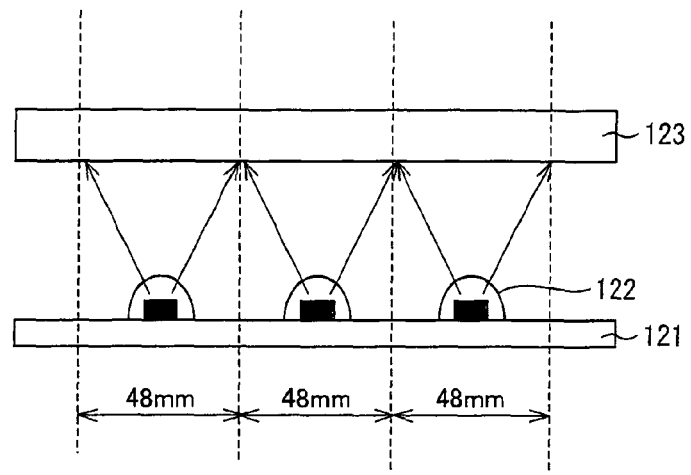
Figure 23B:
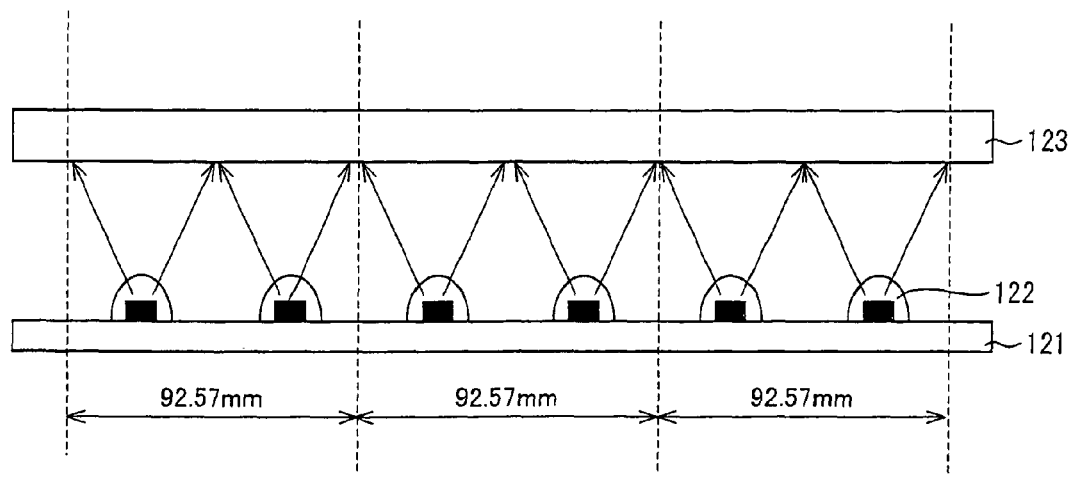

(a) of FIG. 23

Figure 11:
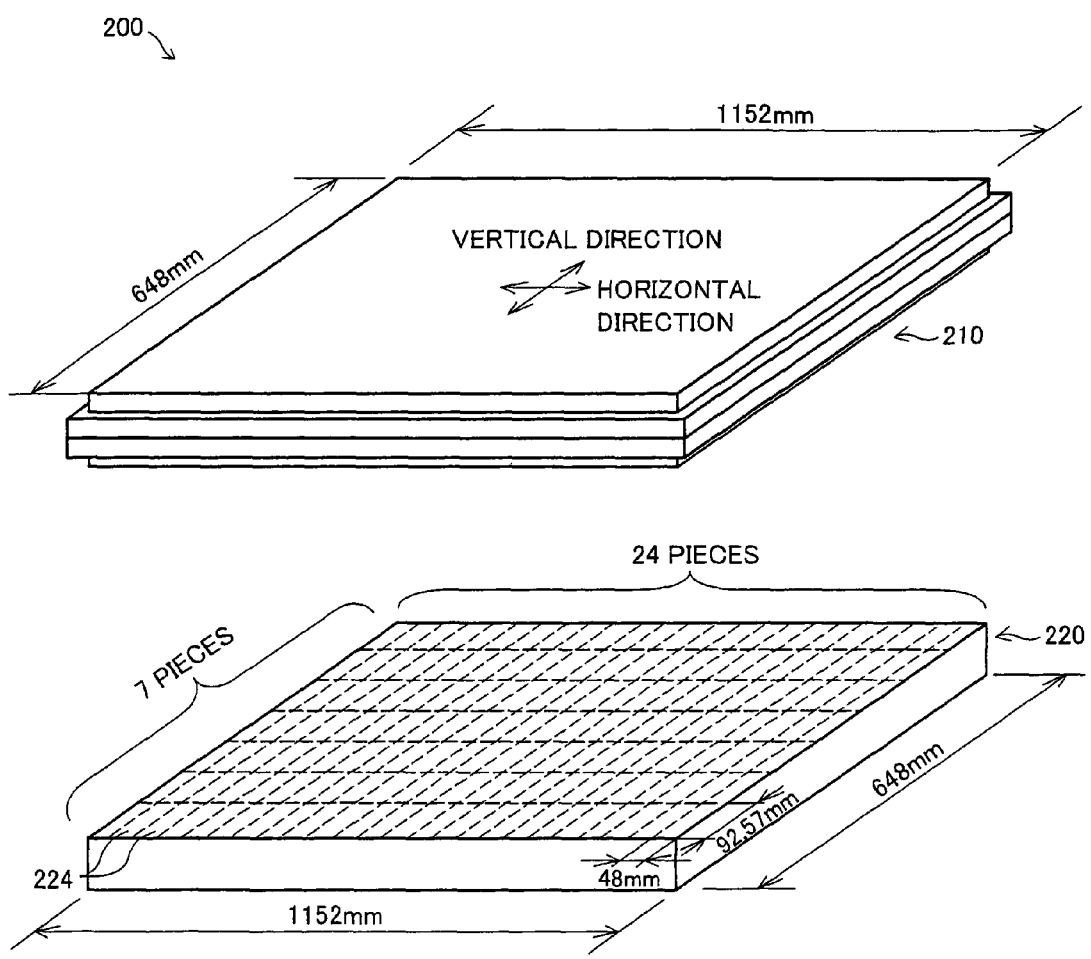
FIG. 11

(a) of FIG. 23 is an explanatory view illustrating a cross section along a horizontal direction of the liquid crystal panel and the backlight unit both of which are included in the liquid crystal display device illustrated in FIG. 11.

(b) of FIG. 23

(b) of FIG. 23 is an explanatory view illustrating a cross section along a vertical direction of the liquid crystal panel and the backlight unit both of which are included in the liquid crystal display device illustrated in FIG. 11.

| Reference Signs List | |
|---|---|
| 100 | Liquid crystal display device |
| 110 | Liquid crystal panel |
| 120 | Backlight unit |
| 121 | Substrate |
| 122 | LED |
| 123 | Optical member |
| 124 | Lighting region |
| 130 | Control section |
| 131 | Maximum grayscale level detection section |
| 132 | Light control section |
| 133 | Luminance distribution calculation section |
| 134 | Grayscale conversion section |
| 135 | Liquid crystal driving section |
| 200 | Liquid crystal display device |
| 210 | Liquid crystal panel |
| 220 | Backlight unit |
| 224 | Lighting region |

DESCRIPTION OF EMBODIMENTS

[Embodiment 1]

One embodiment of the present invention is described below. FIG. 1 is a view schematically illustrating a configuration of a liquid crystal display device 100 in accordance with the present embodiment. As illustrated in FIG. 1, the liquid crystal display device 100 includes a liquid crystal panel 110 and a backlight unit 120. Further, the liquid crystal display device 100 is provided to a television receiver and displays an image of a television broadcast (input image signal) received by a receiving device (not illustrated).

The liquid crystal panel 110 is an IPS-mode liquid crystal panel. However, any transmissive liquid crystal panel may be used as the liquid crystal panel 110 as long as the transmissive liquid crystal panel can carry out multiple grayscale display. For example, it is possible to adopt a liquid crystal panel in another mode such as a TN mode, a VA mode, an OCB mode, or the like. Note that, a conventionally known liquid crystal panel can be used as the liquid crystal panel, so that explanations thereof are omitted here.

A screen size of the liquid crystal panel 110 is 37 inch, and a ratio of a length in a vertical direction (an up-and-down direction with respect to a display screen of the liquid crystal panel 110) and a length in a horizontal direction (a left-and-right direction with respect to the display screen of the liquid crystal panel 110) under a standard installation condition in use is 9:16. Accordingly, an effective display size of the liquid crystal panel 110 is 460.8 mm in the vertical direction and 819.2 mm in the horizontal direction.

Figure 2:
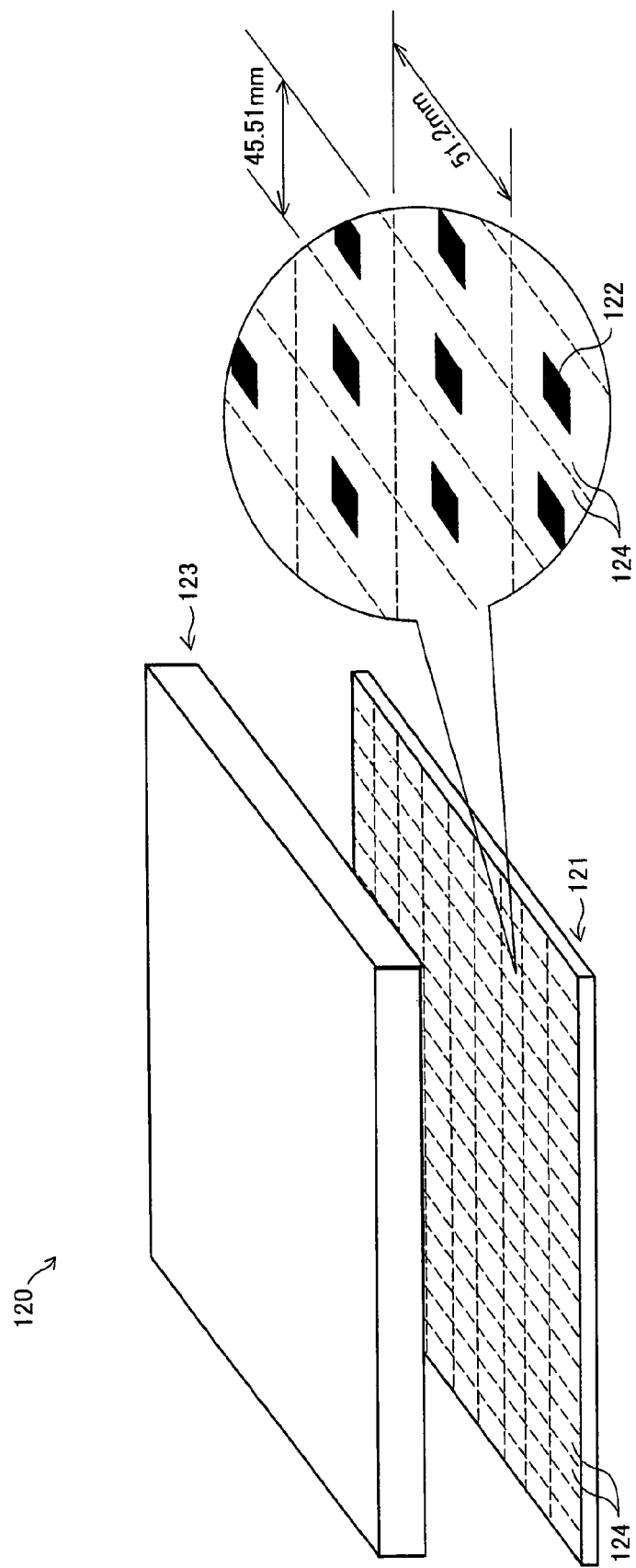
FIG. 2

FIG. 2 is a view schematically illustrating a configuration of the backlight unit 120. As illustrated in FIG. 2, the backlight unit 120 includes a substrate 121 and an optical member 123.

A large number of LEDs 122 are disposed on the substrate 121, and these LEDs 122 constitute a large number of lighting regions 124. Note that, a material for the substrate 121 is not particularly limited as long as the material is so rigid as to support the LEDs 122.

The optical member 123 is arranged such that functional members such as a diffusing plate, a prism sheet, and the like (which are not illustrated) overlap each other, and is provided on a surface of the substrate 121, which surface is on a liquid crystal panel 110 side.

As in the liquid crystal panel 110, an effective lighting size of the backlight unit 120 is 460.8 mm in the vertical direction and 819.2 mm in the horizontal direction.

Note that, in the present embodiment, the effective lighting region of the backlight 120 is divided into 9 pieces in the vertical direction and is divided into 18 pieces in the horizontal direction, thereby forming 162 lighting regions 124. Accordingly, a size of each lighting region 124 is 51.2 mm in the vertical direction and 45.51 mm in the horizontal direction. In this manner, in the present embodiment, each lighting region has a smaller width in the horizontal direction than in the vertical direction. Note that, each lighting region 124 includes a single LED 122 thereon.

Figure 3:
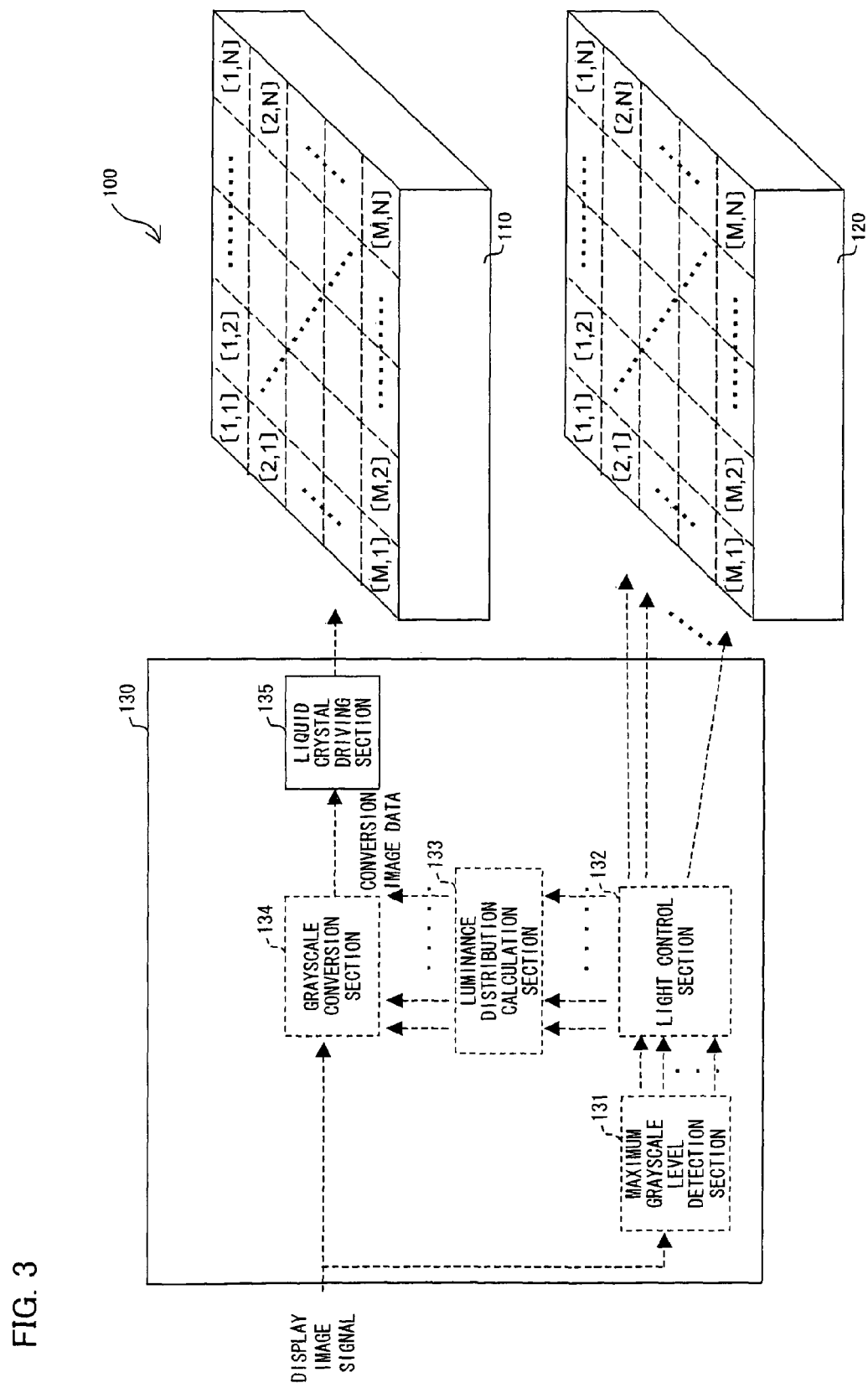
FIG. 3

FIG. 3 is a block diagram schematically illustrating a configuration of the liquid crystal display device 100. As illustrated in FIG. 3, the liquid crystal display device 100 includes a control section 130 for controlling operations of the liquid crystal panel 110 and the backlight unit 120. The control section 130 adjusts a light luminance level of each lighting region 124, i.e., light emission intensity of each LED 122 in accordance with a grayscale level of each pixel included in a display region corresponding to each lighting region 124 which grayscale level is indicated by an input image signal.

Further, in accordance with (i) the grayscale level of each pixel which grayscale level is indicated by the input image signal and (ii) the light luminance level of each lighting region 124, the control section 130 converts the input image signal into a conversion image signal so that a reduction in contrast due to cross talk between the lighting regions is suppressed. The control section 130 drives the liquid crystal panel 110 in accordance with the conversion image signal thus generated. Because of this, it is possible to, out of the entire screen, (i) increase a light luminance of a lighting region 124 corresponding to a part including a large amount of bright image information, and (ii) decrease a light luminance of a lighting region 124 corresponding to a part including a large amount of dark image information. Thereby, it is possible to realize high quality display whose contrast is effectively improved.

Specifically, the control section 130 includes a maximum grayscale level detection section 131, a light control section 132, a luminance distribution calculation section 133, a grayscale conversion section 134, and a liquid crystal driving section 135, as illustrated in FIG. 3.

The maximum grayscale level detection section 131 detects a maximum grayscale level S of each display region in accordance with an input image signal for a pixel included in the display region corresponding to each lighting region 124. That is, the maximum grayscale level detection section 131 detects a maximum grayscale level S (m, n) of an input image signal in a display region disposed in an m-th column and in an n-th row (in the present embodiment, "m" is an integer not less than 1 but not more than 9, and "n" is an integer not less than 1 but not more than 18).

The light control section 132 sets a light luminance I of each lighting region 124 in accordance with the maximum grayscale level of each display region which maximum grayscale level has been detected by the maximum grayscale level detection section 131. The light control section 132 controls a current supplied from power source means (not illustrated) to each LED 122 in accordance with the light luminance I thus set, thereby controlling light emission intensity of each LED 122. In this manner, a light luminance for each lighting region 124 can be controlled in accordance with an input image signal.

Specifically, the light control section 132 sets the light luminance I (m, n) of the LED 122 in a lighting region disposed in the m-th column and the n-th row on the basis of the following equation (1).

$$I(m,n) = I_{max} \times (S(m,n)/S_{max})^\gamma \quad (1)$$

In this equation, Imax is a maximum light luminance of the LED 122, Smax is a possible maximum grayscale level of the input image signal, S (m, n) is a maximum grayscale level of the input image signal within the display region disposed in the m-th column and the n-th row, and γ is a coefficient (generally, 2.2).

The luminance distribution calculation section 133 integrates a light intensity I (m, n) (p, q) in a pixel, positioned in a p-th column and a q-th row, which light intensity is observed due to turning-on of the lighting region positioned in the m-th column and the n-th row, when the lighting region positioned in the m-th column and the n-th row is turned on with a luminance I (m, n), in accordance with the light luminance I of each lighting region which light luminance has been set by the light control section 132. In this manner, the luminance distribution calculation section 133 calculates light luminances I (p, q) for all the pixels.

Specifically, the luminance distribution calculation section 133 calculates the luminance distribution I (p, q) in accordance with the following equation (2).

$$I(p, q) = \sum_{m} \sum_{n} I(m, n)(p, q) \quad (2)$$

The grayscale conversion section 134 converts an image input signal into a conversion image signal s* in accordance with the luminance distribution I (p, q) which has been calculated by the luminance distribution calculation section 133.

Specifically, the grayscale conversion section 134 generates the conversion image signal s* in accordance with the following equation (3).

$$s^*(p,q) = s(p,q) \times (I\max/I(p,q))^{1/\gamma} \quad (3)$$

In this equation, s (p, q) is an input image signal for a pixel positioned in a p-th column and a q-th row, and s* (p, q) is a conversion image signal for the pixel positioned in the p-th column and the q-th row.

The liquid crystal driving section 135 drives the liquid crystal panel 110 so that an image based on the conversion image signal s* generated by the grayscale conversion section 134 is displayed. Note that, a conventionally known liquid crystal driving device can be used as the liquid crystal driving section 135, so that explanations thereof are omitted here.

As described above, in the present embodiment, a size of each lighting region 124 has a smaller width in the horizontal direction than in the vertical direction. That is, in a case where a vertically spatial size (length) of each lighting region 124 is bl (V) and a horizontally spatial size (length) of each lighting region 124 is bl (H), the size of each lighting region 124 is set so as to satisfy such a relationship that bl (V)>bl (H). This makes it possible to provide an observer positioned in a wide viewing angle range in a horizontal direction, with a high quality image in which a reduction in contrast is suppressed.

(a) of FIG. 22 is an explanatory view illustrating cross sections of the liquid crystal panel 110 and the backlight unit 120 in a horizontal direction of the liquid crystal display device 100. (b) of FIG. 22 is an explanatory view illustrating cross sections of the liquid crystal panel 110 and the backlight unit 120 in a vertical direction of the liquid crystal display device 100.

As illustrated in these views, a horizontal width of the lighting region of each LED 122 is made smaller than a vertical width, so that a horizontal angle θ1 of light emitted from the LED 122 can be made narrower than a vertical angle θ2 (θ1<θ2). Therefore, horizontally spatial spread of light (including cross talk between the lighting regions) can be made narrower than vertically spatial spread of light. This makes it possible to cause a reduction in contrast to be less perceivable to an observer positioned in a wide viewing angle in the left-and-right direction.

Note that, in addition to the foregoing configuration, a diffusion control member such as a lens or the like can be provided on a surface of each LED 122 or in the vicinity of each LFD 122, so as to control spread of light emitted from the LED 122. For example, a diffusion control member may be provided so as to suppress horizontal spread of light emitted from the LED 122.

Figure 4:
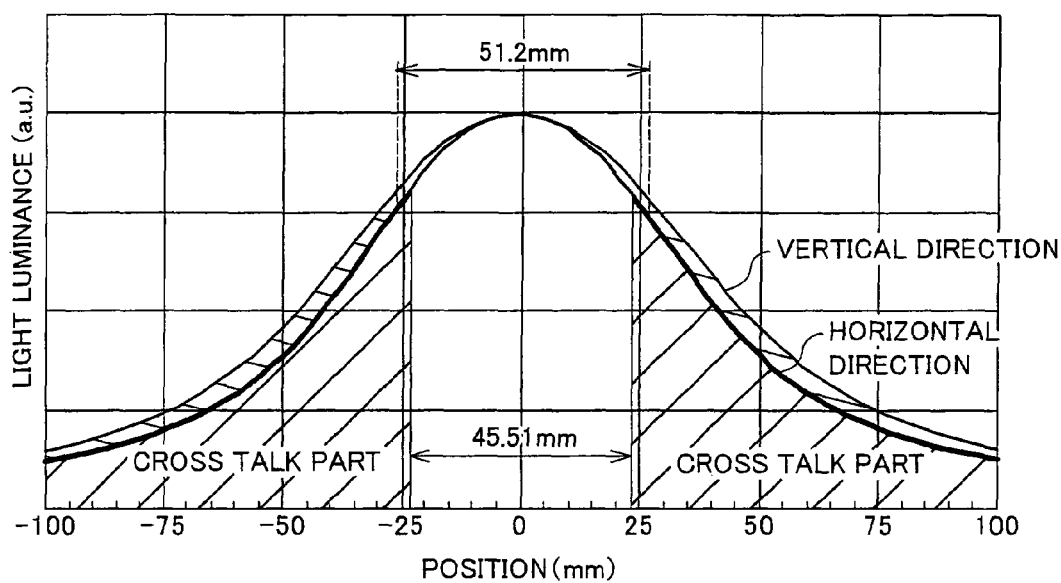
FIG. 4

FIG. 4 is a graph showing luminance distribution around a certain lighting region 124 which luminance distribution is observed when an LED 122 of only the certain lighting region 124 is turned on. As illustrated in FIG. 4, a horizontal width of each lighting region 124 is made smaller than a vertical width, so that horizontal spread of a cross talk part between the lighting regions can be made smaller than the vertical spread. Thus, it is possible to provide an observer positioned in a wide viewing angle in a horizontal direction with a high quality image in which a reduction in contrast is suppressed.

Note that, Non Patent Literature 1 describes such an investigation report that television viewing angles at a general home widely distribute within a range of ±60° in a horizontal direction and ±30° in a vertical direction. That is, under a general television viewing condition, an observer is likely to feel defectiveness of an image in horizontal viewing angles rather than the vertical viewing angles, which defectiveness is caused by a luminance difference depending on a position of a black display part. Thus, by making the horizontal width of each lighting region 124 smaller than the vertical width in the manner described in the present embodiment, it is possible to (i) suppress the degree of the reduction in contrast, perceivable to a television observer in a general home, and thereby (ii) provide the observer with a higher quality image.

Note that, in order to satisfy the foregoing relationship, the number of pieces obtained by dividing the lighting region is set so as to satisfy the following expression (4) where H is a vertical width of an effective lighting region of the backlight unit 120, V is a horizontal width the effective lighting region, h is the number of lighting regions divided in a vertical direction, and v is the number of lighting regions divided in a horizontal direction.

$$H > v \times H/V \quad (4)$$

Further, the present embodiment describes the configuration in which the backlight unit 120 includes a large number of LEDs 122 as light source units, but the configuration of the light source unit is not limited to this. For example, it is possible to use: a light source unit including another light source such as an EL or the like; or a light source unit obtained by combining a light source with an optical member such as a light guide, a mirror, a micro lens, or the like, for example.

Further, the present embodiment describes the configuration in which each lighting region 124 includes a single LED 122, but the number of lighting regions 124 is not necessarily identical to the number of light sources. For example, a plurality of light source units can constitute a single lighting region. Note that, in a case of the configuration in which the number of the light source units is the same as the number of the lighting regions, a cycle at which the light source units are disposed has to be set so that bl (V)>bl (H), in order to make the horizontal width of each lighting region smaller than the vertical width. However, in a case of the configuration in which the plurality of light source units constitute a single lighting region, the cycle at which the light source units are disposed does not have to be set in this manner, so that the backlight unit 120 can be more freely designed.

Further, the number of divided effective lighting regions (the number of the lighting regions 124) in the backlight unit 120 is not limited to the foregoing number. In order to suppress a reduction in contrast due to cross talk between the lighting regions, it is preferable to increase the number of lighting regions, that is, the number of the divided effective lighting regions.

Figure 5:
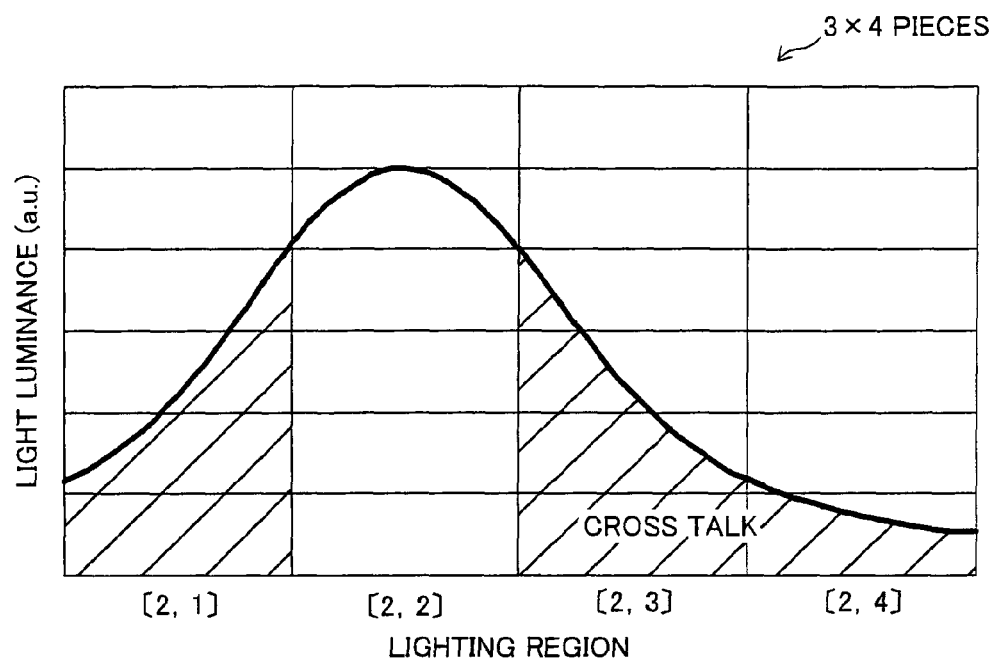
FIG. 5
Figure 5:
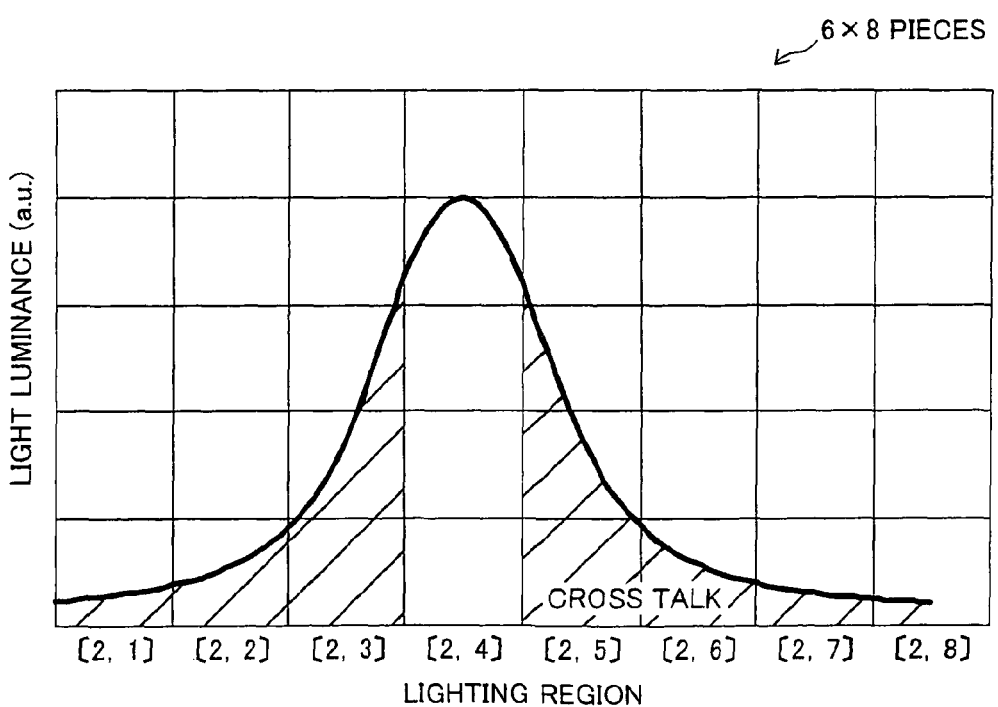

FIG. 5 is a graph showing an influence of cross talk around a white display region in a case where a certain lighting region is white display and the other lighting regions are black display in a configuration in which the number of pieces obtained by dividing the backlight unit is 12 (3 in a vertical direction×4 in a horizontal direction) and in a configuration in which the number of pieces obtained by dividing the backlight unit is 48 (6 in a vertical direction×8 in a horizontal direction). As illustrated in FIG. 5, by increasing the number of the lighting regions (divided effective lighting regions), it is possible to make spread of the cross talk part between the lighting regions narrower. Thus, the observer is less likely to feel a change in luminance in the black display depending on a position in the vicinity of a border between the white display and the black display, so that the observer is less likely to feel defectiveness of the image.

COMPARATIVE EXAMPLE 1

Figure 6:
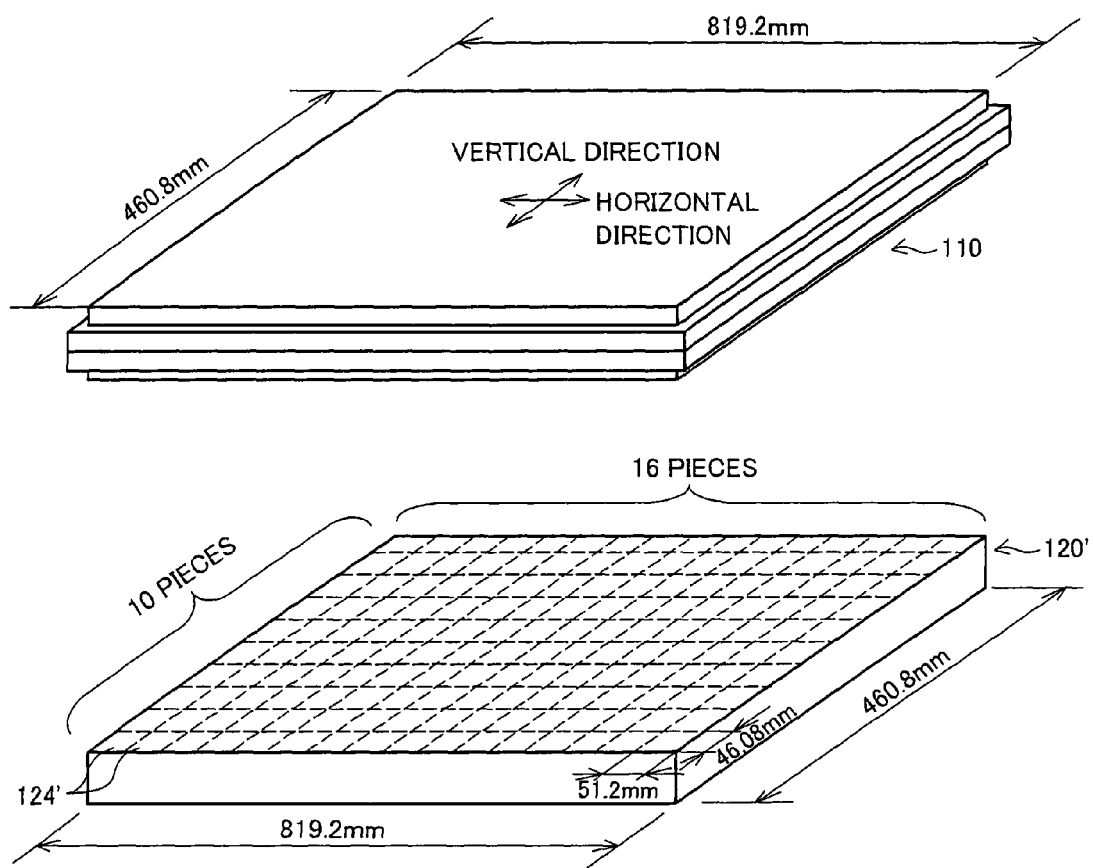
FIG. 6

FIG. 6 is a view schematically illustrating a configuration of a liquid crystal display device 100' in accordance with Comparative Example 1. As illustrated in FIG. 6, the liquid crystal display device 100' includes a liquid crystal panel 110 and a backlight unit 120'. Note that, the liquid crystal panel 110 provided to the liquid crystal display device 100' is configured in the same manner as the liquid crystal panel 110 provided to the liquid crystal display device 100.

Figure 7:
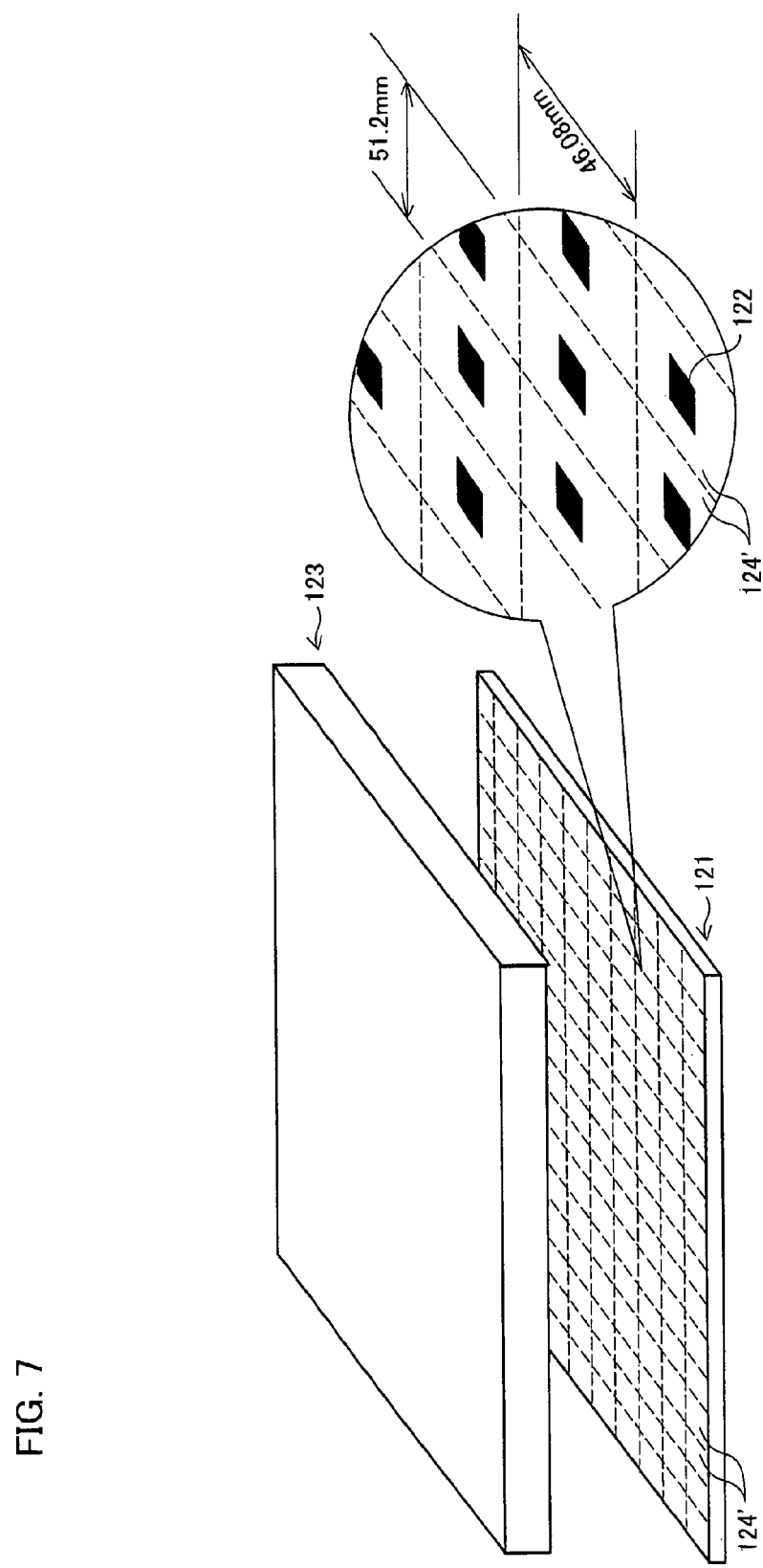
FIG. 7

FIG. 7 is a view schematically illustrating a configuration of the backlight unit 120'. As illustrated in FIG. 7, the backlight unit 120' includes a substrate 121 and an optical member 123. The substrate 121 and the optical member 123 which are provided on the backlight unit 120' are configured in the same manner as the substrate 121 and the optical member 123 which are provided on the backlight unit 120. However, the backlight unit 120' is different from the backlight unit 120 in the number of LEDs 122 provided on the substrate 121, the number of lighting regions 124', and a size of each lighting region 124'.

That is, the backlight unit 120 of the liquid crystal display device 100 is configured so that the effective lighting region is divided into 9 pieces in a vertical direction and is divided into 18 pieces in a horizontal direction so as to form 162 lighting regions 124. On the other hand, the backlight unit 120' of the liquid crystal display device 100' is configured so that the effective lighting region is divided into 10 pieces in the vertical direction and is divided into 16 pieces in the horizontal direction so as to form 160 lighting regions 124'. Thus, as illustrated in FIG. 7, a size of each lighting region 124' is 46.08 mm in the vertical direction and 51.2 mm in the horizontal direction.

Figure 8:
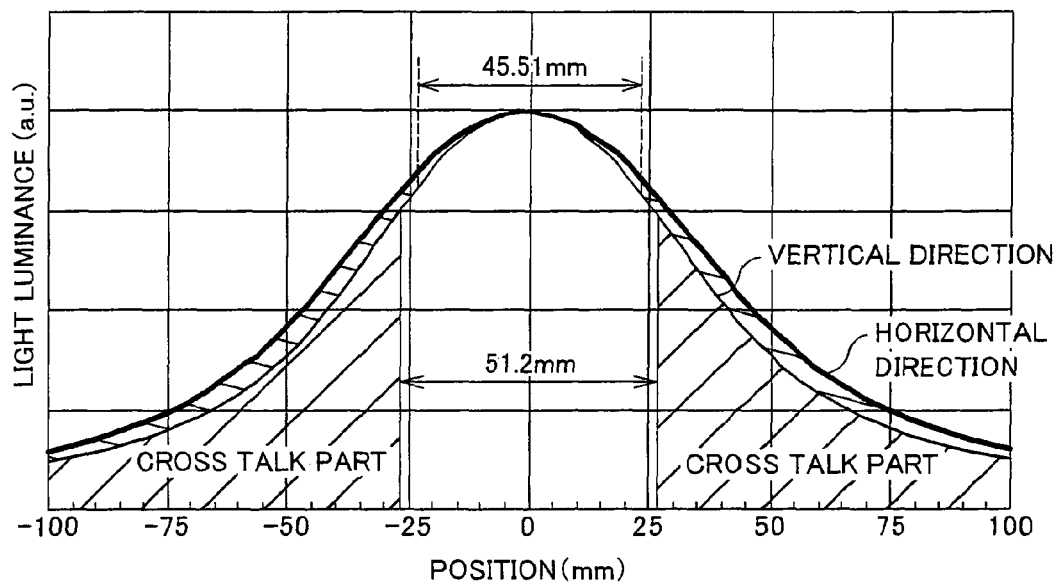
FIG. 8

FIG. 8 is a graph showing luminance distribution around a certain lighting region 124' which luminance distribution is observed when an LED 122 of only the certain lighting region 124' is turned on. As illustrated in FIG. 8, spread with respect to a spatial position of a cross talk part between the lighting regions in the backlight unit 120' is greater in the horizontal direction than in the vertical direction.

Figure 9:
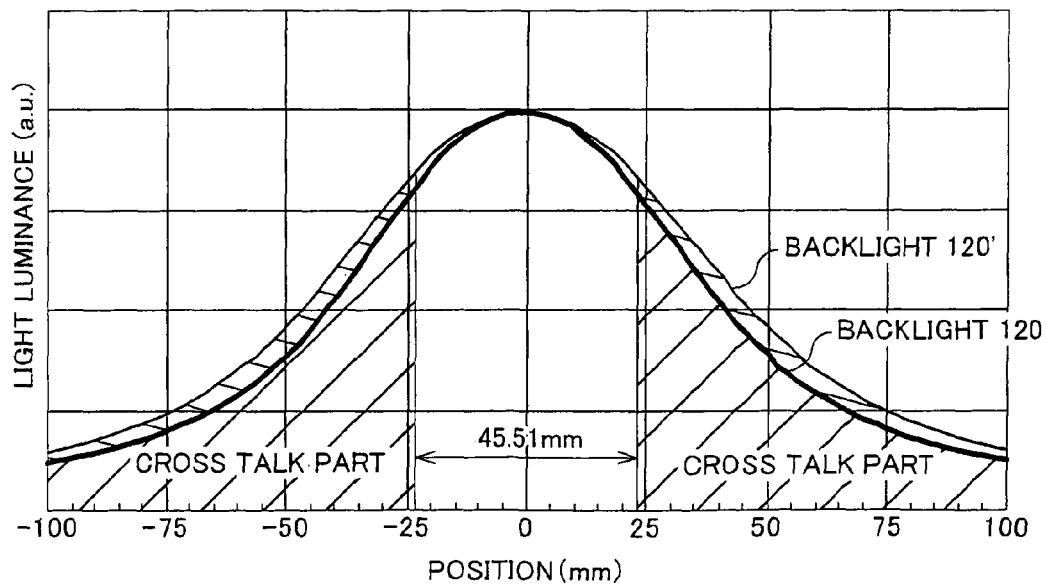
FIG. 9

FIG. 9 is a graph showing (i) luminance distribution horizontally around a certain lighting region 124 which luminance distribution is observed when an LED 122 of only the certain lighting region 124 in the backlight unit 120 is turned on and (ii) luminance distribution horizontally around a certain lighting region 124' which luminance distribution is observed when an LED 122 of only the certain lighting region 124' in the backlight unit 120' is turned on. As illustrated in FIG. 9, the backlight unit 120 in accordance with the present embodiment can decrease the horizontal spread of the cross talk part between the lighting regions more greatly than the backlight unit 120' in accordance with Comparative Example 1.

Figure 10:
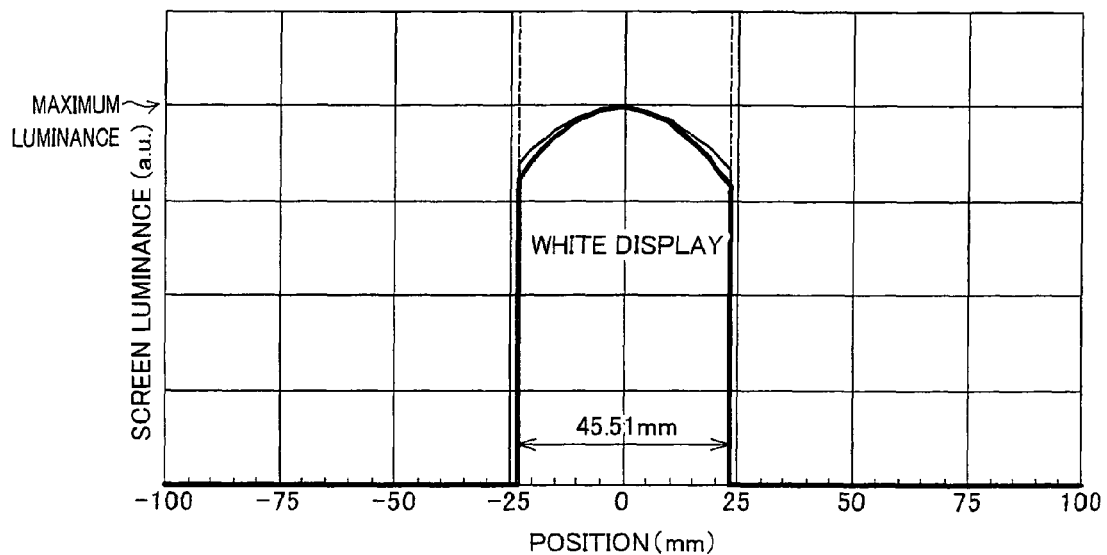
FIG. 10
Figure 10:
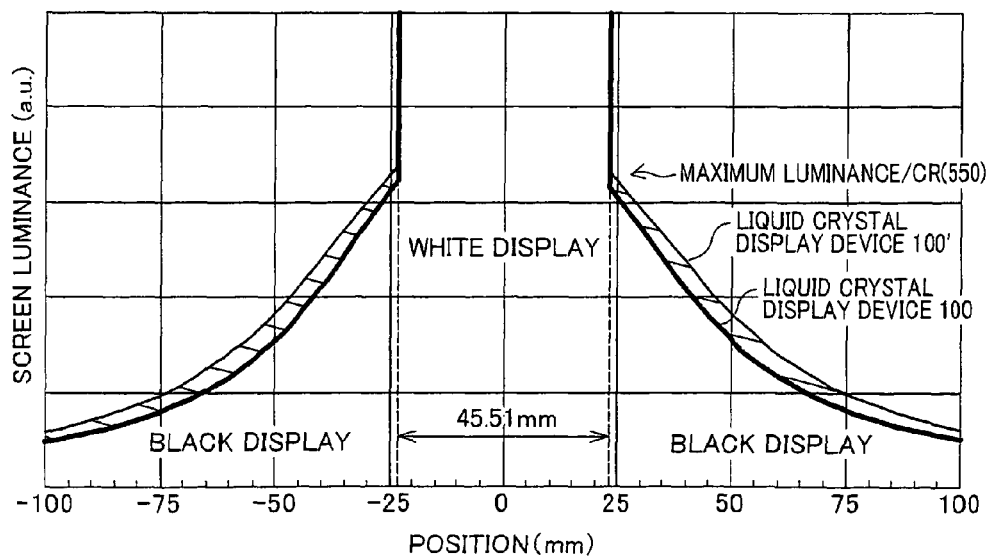

FIG. 10 is a graph showing luminances of a display image viewed from a direction whose angle is 60° with respect to a horizontal direction (the contrast of the liquid crystal panel 110 is 550 in this viewing direction) in a case where a part of the effective lighting region is white display and a part around the white display is black display and a light luminance of the white display is increased and a light luminance of the black display is decreased, in each of the liquid crystal display device 100 and the liquid crystal display device 100'. Note that, an upper graph and a lower graph of FIG. 10 show the same data but they are different from each other in a range of a vertical axis (the lower graph is obtained by enlarging a low luminance part of the upper graph). As shown in FIG. 10, the liquid crystal display device 100 in accordance with the present embodiment can more greatly decrease a luminance change depending on a position of the black display part, which change occurs due to the cross talk between the lighting regions, than the liquid crystal display device 100' in accordance with Comparative Example 1, under a condition where an image is viewed at an angle of 60° with respect to a horizontal direction. This makes it possible to cause defectiveness to be less perceivable to the observer.

[Embodiment 2]

Another embodiment of the present invention is described below. FIG. 11 is a view schematically illustrating a configuration of a liquid crystal display device 200 in accordance with the present embodiment. As illustrated in FIG. 11, the liquid crystal display device 200 includes a liquid crystal panel 210 and a backlight unit 220. Further, the liquid crystal display device 200 is provided to a television receiver and displays an image of a television broadcast received by a receiving device (not illustrated).

As the liquid crystal panel 210, a VA-mode liquid crystal panel is used. However, the configuration is not limited to this as long as the liquid crystal panel 210 is a transmissive liquid crystal panel which can carry out multiple grayscale display. For example, it is possible to use a liquid crystal panel in another mode such as TN mode, VA mode, OCB mode, or the like. Note that, a publicly known liquid crystal panel can be used as the liquid crystal panel, so that explanations thereof are omitted here.

A screen size of the liquid crystal panel 210 is 52 inch, and a ratio of a length in a vertical direction and a length in a horizontal direction under a standard installation condition in use is 9:16. Accordingly, an effective display size of the liquid crystal panel 110 is 648 mm in the vertical direction and 1152 mm in the horizontal direction.

Figure 12:
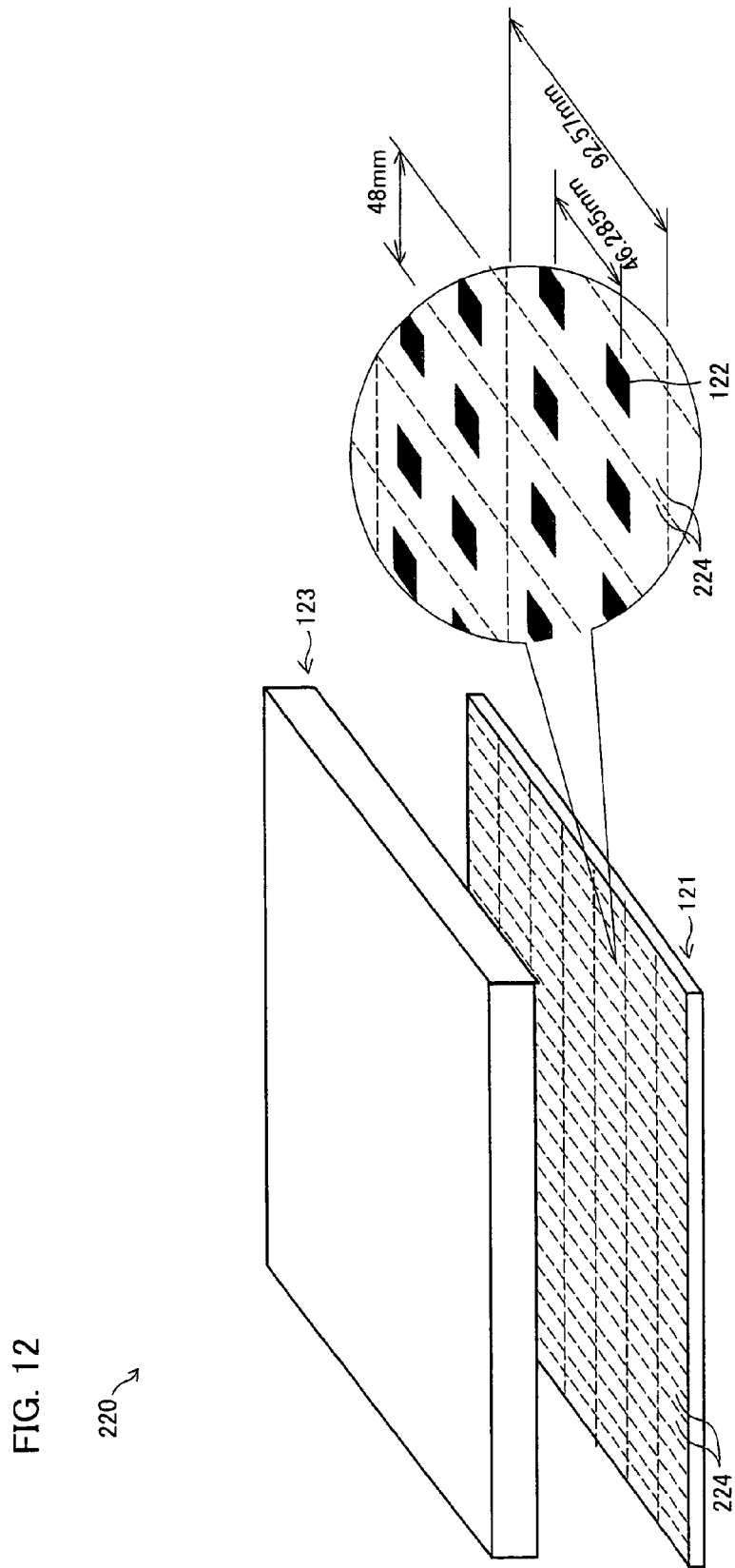
FIG. 12

FIG. 12 is a view schematically illustrating a configuration of the backlight unit 220. As illustrated in FIG. 12, the backlight unit 220 includes a substrate 121 and an optical member 123. The substrate 121 and the optical member 123 are configured in the same manner as those provided on the backlight unit 120 of Embodiment 1. However, the substrate 121 and the optical member 123 are different from those of Embodiment 1 in the number of LEDs provided on the substrate 121 and the number of lighting regions.

As in the liquid crystal panel 210, an effective lighting region of the backlight unit 220 is 648 mm in a vertical direction and 1152 mm in a horizontal direction. In the present embodiment, the effective lighting region of the backlight unit 220 is divided into 7 pieces in the vertical direction and is divided into 24 pieces in the horizontal direction so as to form 168 lighting regions 224. Accordingly, a size of each lighting region 224 is 92.57 mm in the vertical direction and 48 mm in the horizontal direction. In this manner, in the present embodiment, each lighting region has a smaller width in the horizontal direction than in the vertical width of the lighting region, as in Embodiment 1.

Further, in the present embodiment, each lighting region 224 includes two LEDs 122 (336 LEDs 122 in the entire backlight unit 220) which are disposed so that a vertical interval between the two LEDs 122 is 46.285 mm in each lighting region 224. That is, a size of each lighting region 224 is 92.57 mm in the vertical direction and 48 mm in the horizontal direction, and a cycle (pitch) at which the LEDs 122 are disposed is 46.285 mm in the vertical direction and 48 mm in the horizontal direction.

Further, the liquid crystal display device 200 includes a control section 130 for controlling operations of the liquid crystal panel 210 and the backlight unit 220, as in the liquid crystal display device 100 in accordance with Embodiment 1. The control section 130 adjusts a light luminance level of each lighting region 224, i.e., light intensity of LEDs 122 provided on each lighting region 224, in accordance with a grayscale level S of each pixel included in a display region corresponding to each lighting region 224 which grayscale level is indicated by an input image signal. Further, in accordance with (i) the grayscale level of each pixel which grayscale level is indicated by the input image signal and (ii) the light luminance level of each lighting region 224, the control section 130 converts the input image signal into a conversion image signal so that a reduction in the contrast, due to cross talk between the lighting regions, is suppressed, and the control section 130 drives the liquid crystal panel 210 in accordance with the conversion image signal thus generated. As a result, out of the entire screen, a part including a large amount of bright image information can increase a light luminance of a corresponding lighting region 224 and a part including dark image information can adversely decrease the light luminance of the corresponding lighting region 224, thereby carrying out high quality display with its contrast effectively improved. Note that, a specific configuration and a specific function of the control section 130 are the same as those in Embodiment 1, so that explanations thereof are omitted here.

As described above, in the present embodiment, a size of each lighting region 224 is arranged so that its horizontal width is smaller than its vertical width. This makes it possible to provide an observer positioned in a wide viewing angle range the horizontal direction, with a high quality image in which a reduction in contrast is suppressed.

(a) of FIG. 23 is an explanatory view illustrating horizontal cross sections of the liquid crystal display panel 110 and the backlight unit 120 in the liquid crystal display device 100. (b) of FIG. 23 is an explanatory view illustrating vertical cross sections of the liquid crystal panel 110 and the backlight unit 120 in the liquid crystal display device 100.

As illustrated in these views, each lighting region lighted by the LED 122 is caused to have a smaller width in the horizontal direction than in the vertical direction, so that a horizontally spreading angle of light emitted from the LED 122 can be made narrower than a vertically spreading angle of the light. Thereby, horizontal spatial spread of light, including cross talk between the lighting regions, can be made narrower than vertically spatial spread of light. This makes it possible to cause a reduction in contrast to be less perceivable to an observer positioned in a wide viewing angle range a left-and-right direction.

Figure 13:
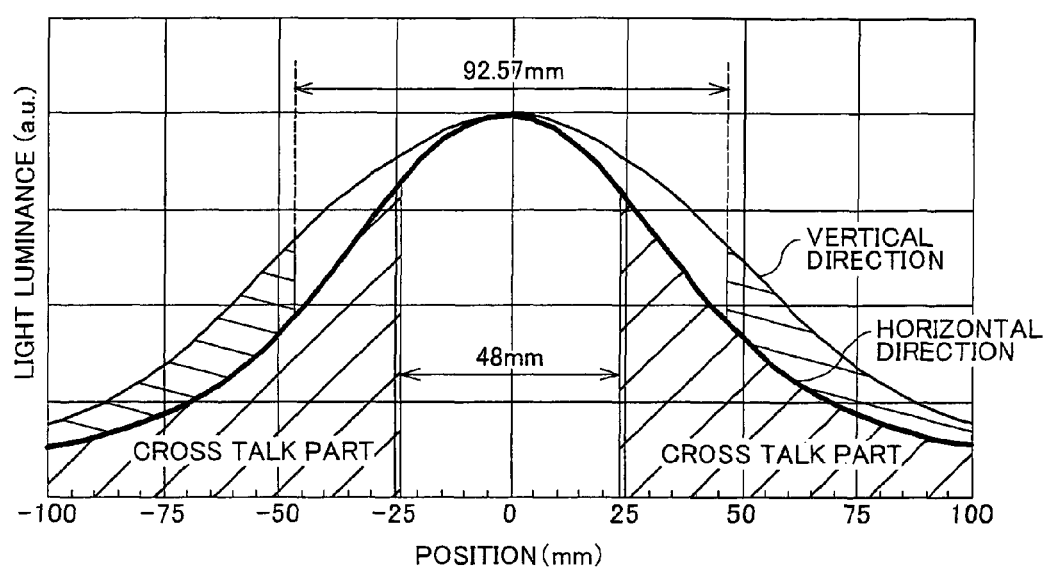
FIG. 13

FIG. 13 is a graph showing luminance distribution around a certain lighting region 224 which luminance distribution is observed when two LEDs 122 of only the certain lighting region 224 are turned on. That is, FIG. 13 shows synthesis of luminance distributions resulting from light emission of the two LEDs 122 when the two LEDs 122 provided on the lighting region 224 are turned on. As shown in FIG. 13, a horizontal width of each lighting region 224 is made smaller than a vertical width of the lighting region 224, so that horizontal spread of a cross talk part between the lighting regions can be made smaller than vertical spread. This makes it possible to provide an observer positioned in a wide viewing angle range in the horizontal direction, with a high quality image in which a reduction in contrast is suppressed.

Note that, Non Patent Literature 1 describes such an investigation report that television viewing angles at a general home widely distribute in a range of ±60° in a horizontal direction and ±30° in a vertical direction. That is, under a general television viewing condition, image defectiveness caused by a luminance difference depending on a position of the black display part is more perceivable to an observer at a horizontal viewing angle than at a vertical viewing angle. Therefore, by making a horizontal width of each lighting region 224 smaller than a vertical width of the lighting region 224 as in the present embodiment, it becomes possible to (i) suppress a degree of a reduction in contrast, perceivable to an observer in a general home television, and thereby (ii) provide the observer with a higher quality image.

COMPARATIVE EXAMPLE 2

Figure 14:
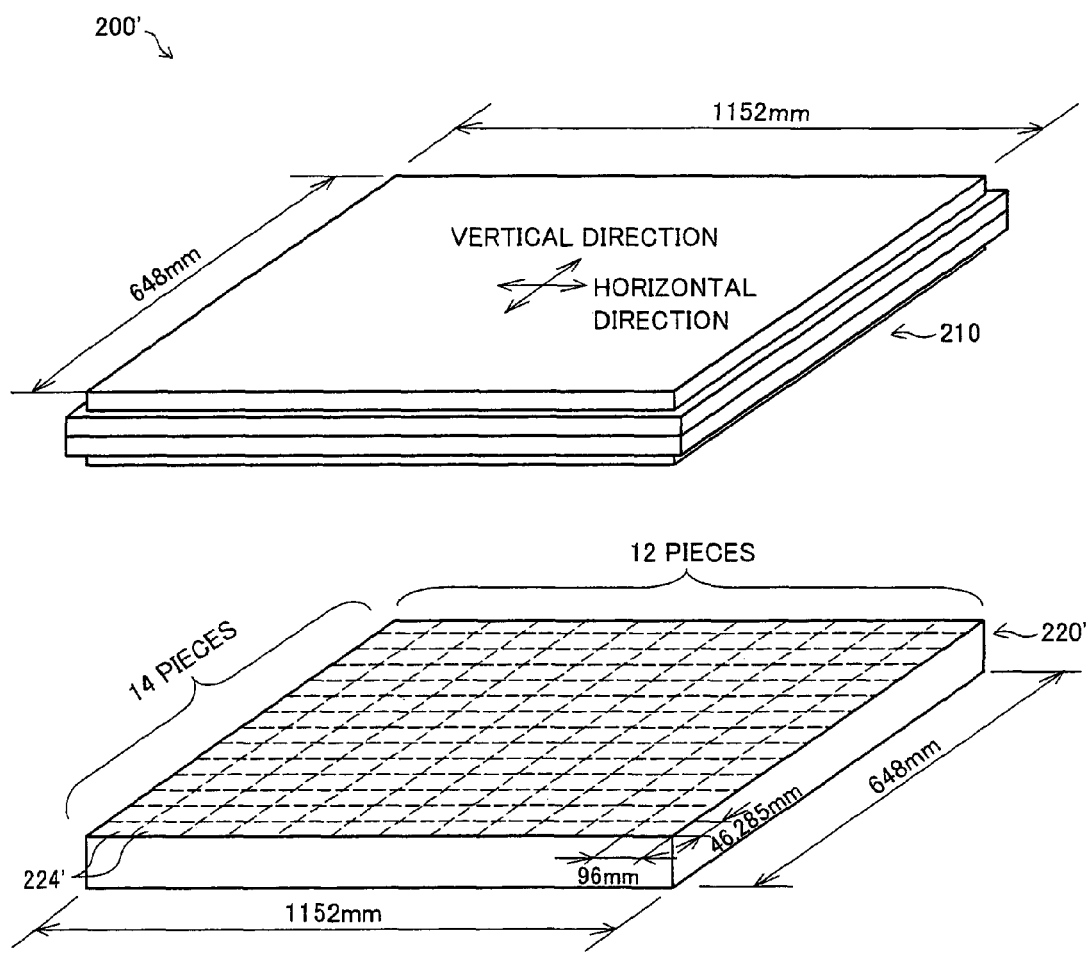
FIG. 14

FIG. 14 is a view schematically illustrating a configuration of a liquid crystal display device 200' in accordance with Comparative Example 2. As illustrated in FIG. 14, the liquid crystal display device 200' includes a liquid crystal panel 210 and a backlight unit 220'. Note that, the liquid crystal panel 210 provided to the liquid crystal display device 200' is configured in the same manner as the liquid crystal panel 210 provided to the liquid crystal display device 200.

Figure 15:
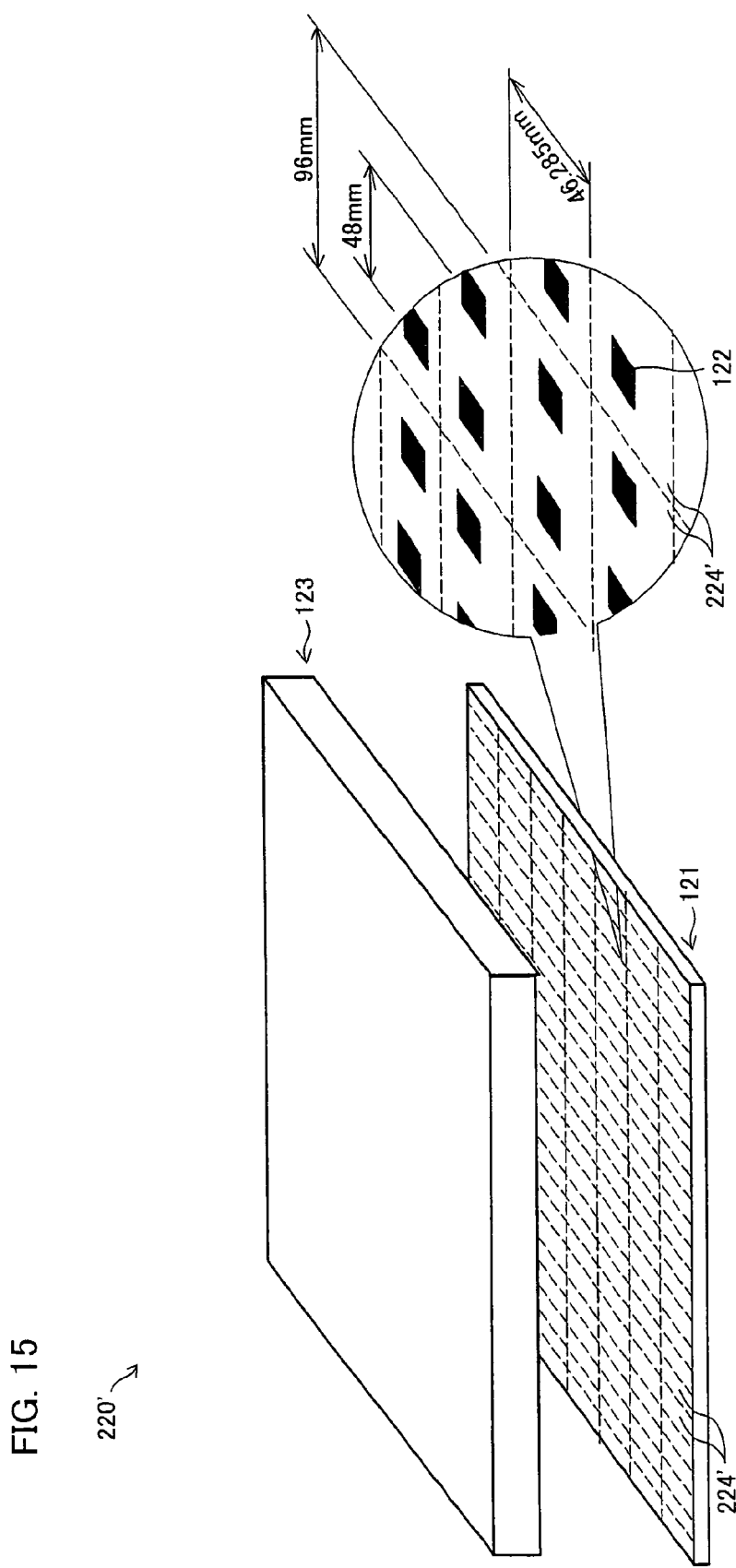
FIG. 15

FIG. 15 is a view schematically illustrating a configuration of the backlight unit 220'. As illustrated in FIG. 15, the backlight unit 220' includes a substrate 121 and an optical member 123. The substrate 121 and the optical member 123 which are provided on the backlight unit 220' are configured in the same manner as the substrate 121 and the optical member 123 which are provided on the backlight unit 220 of the liquid crystal display device 200. However, the backlight unit 220' is different from the backlight unit 220 of the liquid crystal display device 200 in the number of LEDs 122 provided on the substrate 121, the number of lighting regions 224', and a size of each of the lighting regions 224'.

That is, the backlight unit 220 of the liquid crystal display device 200 is arranged so that the effective lighting region is divided into 7 pieces in a vertical direction and into 24 pieces in a horizontal direction so as to form 168 lighting regions 224. On the other hand, the backlight unit 220' of the liquid crystal display device 200' is arranged so that the effective lighting region is divided into 14 pieces in the vertical direction and into 12 pieces in the horizontal direction so as to form 168 lighting regions 224'. Thus, as illustrated in FIG. 15, a size of each lighting region is 46.285 mm in the vertical direction and 96 mm in the horizontal direction.

Further, in the backlight unit 220', each lighting region 224' includes two LEDs 122 (336 LEDs 122 in the entire backlight unit 220) which are disposed so that a vertical interval between the two LEDs is 48 mm in each lighting region 224'. That is, a size of each lighting region 224' is 46.285 mm in the vertical direction and 96 mm in the horizontal direction, and a cycle (pitch) at which the LEDs 122 are disposed is 46.285 mm in the vertical direction and 48 mm in the horizontal direction.

Figure 16:
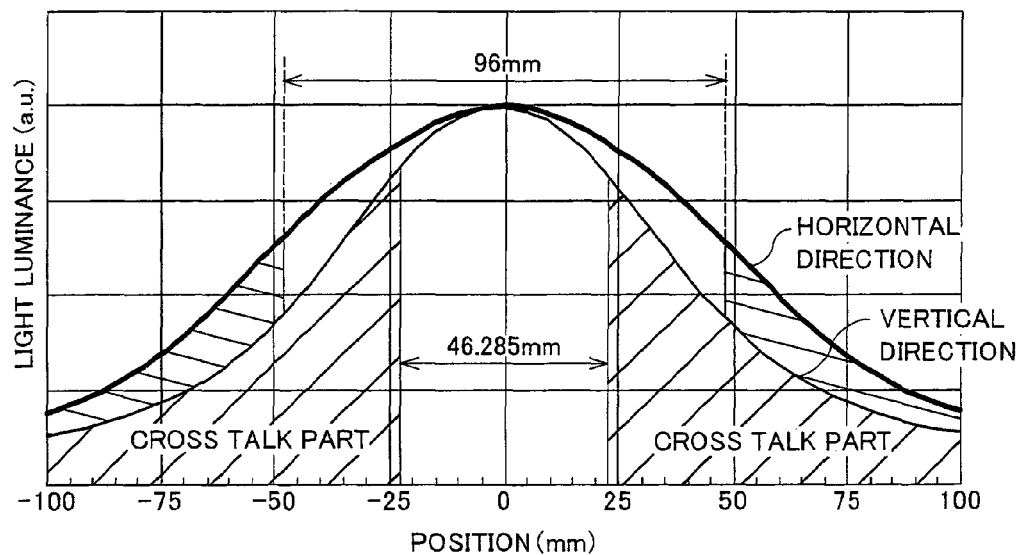
FIG. 16

FIG. 16 is a graph showing luminance distribution around a certain lighting region 224' which luminance distribution is observed when two LEDs 122 of only the certain lighting region 224' is turned on. As shown in FIG. 16, spread with respect to a spatial position of a cross talk part between the lighting regions of the backlight unit 220' is greater in the horizontal direction than in the vertical direction.

Figure 17:
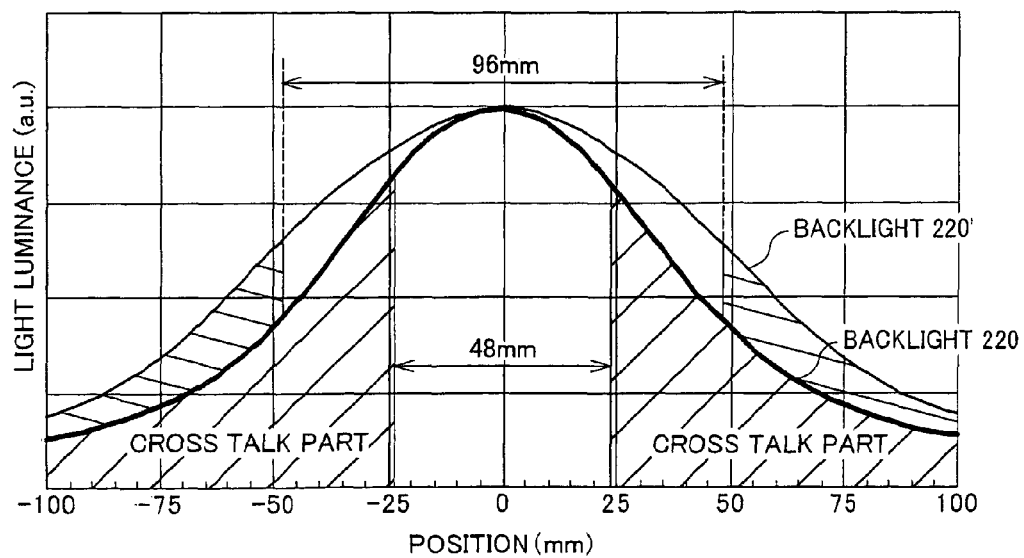
FIG. 17

FIG. 17 is a graph showing (i) luminance distribution horizontally around a certain lighting region 224 which luminance distribution is observed when two LEDs 122 of only the certain lighting region are turned on (synthesis of luminance distributions of light emitted from two LEDs 122, provided on the lighting region 224, when these two LEDs 122 are turned on) and (ii) luminance distribution horizontally around a certain lighting region 224' which luminance distribution is observed when two LEDs 122 of only the certain lighting region 224' are turned on (synthesis of luminance distributions of light emitted from two LEDs 122, provided on the lighting region 224', when these two LEDs 122 are turned on). As shown in FIG. 17, the backlight unit 220 in accordance with the present embodiment can more greatly reduce the horizontal spread of the cross talk part between the lighting region than the backlight unit 220' in accordance with Comparative Example 2.

Figure 18:
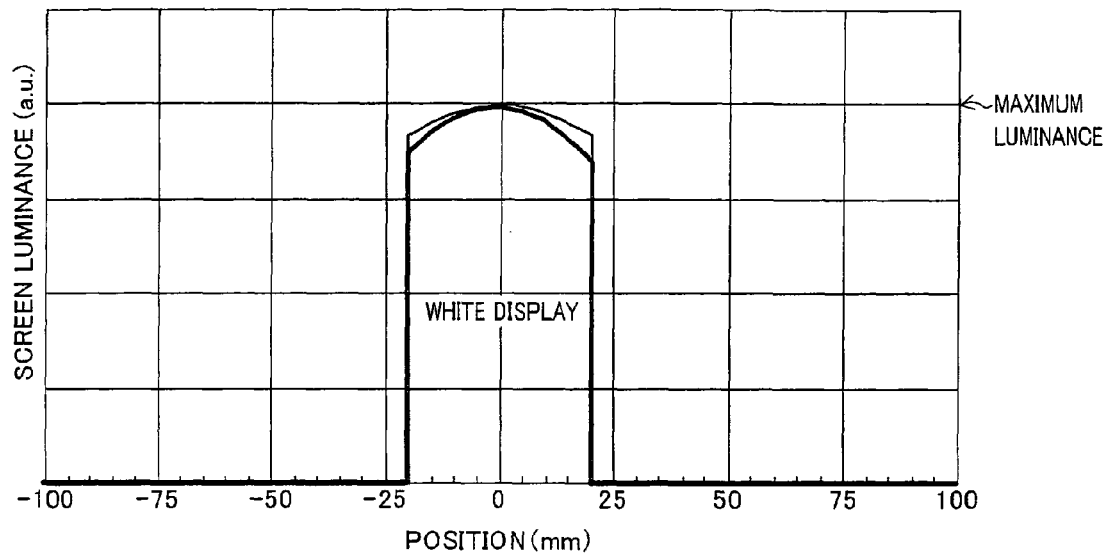
FIG. 18
Figure 18:
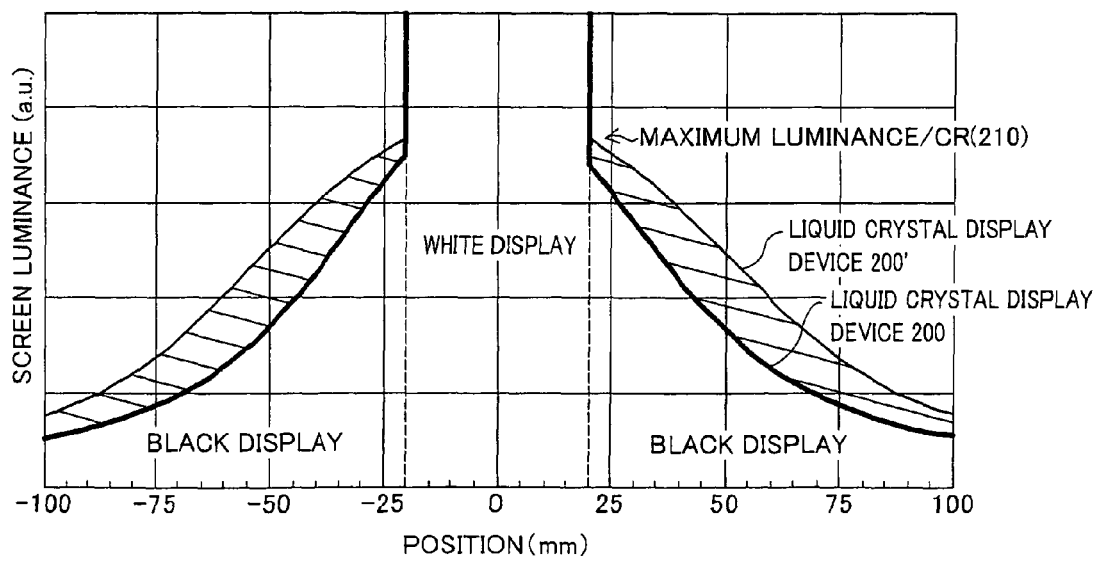

FIG. 18 is a graph showing luminances of a display image viewed from a direction whose angle is 60° with respect to a horizontal direction (the contrast of the liquid crystal panel 210 is 210 in this viewing angle direction) in a case where a part of the effective lighting region is white display and a part around the white display is black display and a light luminance of the white display is increased and a light luminance of the black display is decreased, in each of the liquid crystal display device 200 and the liquid crystal display device 200'. Note that, an upper graph and a lower graph of FIG. 18 show the same data but they are different from each other in a range of a vertical axis (the lower graph is obtained by enlarging a low luminance part of the upper graph). As shown in FIG. 18, the liquid crystal display device 200 in accordance with the present embodiment can more greatly decrease a luminance change depending on a position of the black display part, which change occurs due to the cross talk between the lighting regions, than the liquid crystal display device 200' in accordance with Comparative Example 2, under a condition where an image is viewed at an angle of 60° with respect to the horizontal direction. This makes it possible to cause defectiveness to be less perceivable to the observer.

Further, in the present embodiment, the backlight unit 220 is arranged so that each lighting region 224 includes two LEDs 122 as a light source unit. In this manner, a plurality of LEDs 122 constitute a single lighting region, so that it is possible to more freely determine: a cycle at which the LEDs 122 are disposed; and a size of each lighting region.

Note that, two LEDs 122 are disposed on each lighting region 224, but the configuration is not limited to this, and the number of LEDs 122 provided on each lighting region 224 may be arbitrarily set. Further, the present embodiment describes the light source unit using LEDs, but the configuration of the light source unit is not limited to this. For example, it is possible to use a light source unit including another light source such as an EL or the like, or a light source unit obtained by combining a light source with an optical member such as a light guide, a mirror, or a micro lens, for example.

Further, in each of the foregoing embodiments, each section (each block) constituting the control section 130 provided to each of the liquid crystal display devices 100 and 200 is realized by software using a processor such as a CPU or the like. That is, the control section 130 includes: a CPU (central processing unit) which executes a control program realizing each of the functions; a ROM (read only memory) in which the program is stored; a RAM (random access memory) which develops the program; a storage device (storage medium) such as a memory in which the program and various kinds of data are stored; and the like. Further, the object of the present invention can be achieved in the following manner: a storage medium for computer-readably storing a program code (an execute form program, intermediate code program, or source program) of the control program of each of the liquid crystal display devices 100 and 200, which program is software for implementing the aforementioned functions, is provided to each of the liquid crystal display devices 100 and 200, and a computer (or CPU and MPU) of each of the liquid crystal display devices 100 and 200 reads out the program code stored in the storage medium so as to implement the program.

Examples of the storage medium which satisfies these conditions include: tapes, such as magnetic tapes and cassette tapes; disks including magnetic disks, such as floppy Disks® and hard disks, and optical disks, such as CD-ROMs, magnetic optical disks (MOs), mini disks (MDs), digital video disks (DVDs), and CD-Rs; cards, such as IC cards (including memory cards) and optical cards; and semiconductor memories, such as mask ROMs, EPROMs, EEPROMs, and flash ROMs.

Further, it may be so configured that: each of the liquid crystal display devices 100 and 200 is made connectable to communication networks, and the program code is supplied via the communication networks. The communication networks are not limited to specific means. Specific examples of the communication network include the Internet, an intranet, an extranet, a LAN, an ISDN, a VAN, a CATV communication network, a virtual private network, a telephone line network, a mobile communication network, a satellite communication network, and the like. Further, a transmission medium constituting the communication network is not particularly limited. Specifically, it is possible to use a wired line such as a line in compliance with an IEEE 1394 standard, a USB line, a power line, a cable TV line, a telephone line, an ADSL line, and the like, as the transmission medium. Further, it is possible to use (i) a wireless line utilizing an infrared ray used in IrDA and a remote controller, (ii) a wireless line which is in compliance with a Bluetooth Standard® or an IEEE802.11 wireless standard, and (iii) a wireless line utilizing an HDR, a mobile phone network, a satellite line, a ground wave digital network, and the like, as the transmission medium. Note that, the present invention can be realized by a computer data signal which is realized by electronic transmission of the program code and which is embedded in a carrier wave.

Further, each block of the control section 130 is not necessarily realized by software but may be realized by hardware logic. A combination of hardware for carrying out part of processing and calculation means for executing software for controlling the hardware and carrying out the rest of the processing may be used.

Further, in the embodiments described above, each of the liquid crystal display devices 100 and 200 is provided to a television receiver, but the configuration is not limited to this. For example, each of the liquid crystal display device 100 and 200 may be used as a monitor of a personal computer or the like, and may display an image corresponding to an image signal inputted from a reproducing device of a video tape, a DVD, or the like.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a liquid crystal display device which controls a light luminance in accordance with a lighting region. Particularly, it is possible to enhance contrast viewed by an observer in an oblique direction, so that the present invention is suitably applicable to a television receiver.

The invention claimed is:

1. A liquid crystal display device comprising:
    a liquid crystal display panel;
    lighting means including a plurality of lighting regions for lighting the liquid crystal display panel;
    driving means configured to drive the liquid crystal display panel so that an image is displayed in accordance with an input image signal; and
    light control means configured to control a luminance of each of the plurality of lighting regions of the lighting means, in accordance with the input image signal,
    each of the lighting regions having a smaller width in a left-and-right direction of a display screen of the liquid crystal display panel than in an up-and-down direction of the display screen, wherein
    the light control means is configured to (i) detect, from input image signals for pixels in each of display regions which correspond respectively to the plurality of lighting regions on the display screen, a maximum grayscale level of each of the display regions (ii) set a light luminance of each of the plurality of lighting regions in accordance with a corresponding one of the maximum grayscale levels thus detected, and (iii) control, in accordance with a corresponding one of light luminances thus set, a luminance of each of light sources,
    the liquid crystal display device further comprising:
    luminance distribution calculation means configured to calculate, in accordance with the light luminance set by the light control means for each of the plurality of lighting regions, luminance distribution of light entering from the lighting means into the liquid crystal display panel; and
    grayscale conversion means configured to convert, in accordance with the luminance distribution calculated by the luminance distribution calculation means, the input image signal into a conversion image signal,
    the driving means being configured to drive the liquid crystal display panel so that an image is displayed in accordance with the conversion image signal.

2. The liquid crystal display device according to claim 1, wherein:
    the lighting means has an effective lighting region of a rectangle shape; and
    the lighting means is configured to emits light, toward the liquid crystal display panel, from the effective lighting region in which the plurality of lighting regions are disposed in matrix.

3. The liquid crystal display device according to claim 1, wherein:
    the lighting means includes a light source unit in each of the plurality of lighting regions; and
    the light control means controls the luminance of each of the plurality of lighting regions by controlling light intensity of the light source unit included in each of the plurality of lighting regions.

4. The liquid crystal display device according to claim 3, wherein:
    the lighting means includes a plurality of the light source units in each of the plurality of lighting regions.

5. The liquid crystal display device according to claim 3, wherein:
    the light source unit is an LED.

6. The liquid crystal display device according to claim 1, further comprising:
    luminance distribution calculation means for calculating, in accordance with the luminance set by the light control means for each of the plurality of lighting regions, luminance distribution of light entering from the lighting means into the liquid crystal display panel while taking into consideration of cross talk of light between the plurality of lighting regions; and
    grayscale conversion means for converting, in accordance with the luminance distribution calculated by the luminance distribution calculation means, the input image signal into a conversion image signal so that an influence of the cross talk on a display image is reduced,
    the driving means driving the liquid crystal display panel so that an image is displayed in accordance with the conversion image signal.

* * * * *